(12) United States Patent
Joseph et al.

(10) Patent No.: US 10,850,290 B2
(45) Date of Patent: Dec. 1, 2020

(54) SPRAYGUN WITH BUILT-IN QUICK-FIT CONNECTOR

(71) Applicant: 3M INNOVATIVE PROPERTIES COMPANY, St. Paul, MN (US)

(72) Inventors: Stephen C. P. Joseph, Woodbury, MN (US); Michael J. R. Adams, Norfolk (GB); Neil Delbridge, Warwickshire (GB); Michael W. Howcroft, Hudson, WI (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 1160 days.

(21) Appl. No.: 13/863,028

(22) Filed: Apr. 15, 2013

(65) Prior Publication Data

US 2013/0221130 A1    Aug. 29, 2013

Related U.S. Application Data

(63) Continuation of application No. 12/685,926, filed on Jan. 12, 2010, now abandoned, which is a
(Continued)

(30) Foreign Application Priority Data

Oct. 24, 2002  (GB) .................................... 0224698.1
Mar. 12, 2003  (GB) .................................... 0305614.0
May 14, 2003  (GB) .................................... 0311014.5

(51) Int. Cl.
*B05B 7/24*    (2006.01)
*F16L 37/244*    (2006.01)
(Continued)

(52) U.S. Cl.
CPC .......... *B05B 7/2478* (2013.01); *B05B 7/2408* (2013.01); *B05B 7/2481* (2013.01);
(Continued)

(58) Field of Classification Search
CPC ... B05B 7/2408; B05B 7/2478; B05B 15/065; B05B 7/2481; B65D 41/0407; F16L 37/2445; F16L 37/248; F16L 37/252
(Continued)

(56) References Cited

U.S. PATENT DOCUMENTS 1,294,190 A  *  2/1919  Sturcke ................. B05B 7/1209
                                                     239/345
2,051,518 A     8/1936  Cunningham
(Continued)

FOREIGN PATENT DOCUMENTS

CH    542 104    11/1973
DE    89 02 223    4/1989
(Continued)

OTHER PUBLICATIONS

European Search Report, EP Application No. 09002030, completed Jun. 3, 2009.

*Primary Examiner* — Christopher S Kim
(74) *Attorney, Agent, or Firm* — 3M IPC

(57) ABSTRACT

A spray gun and a detachable liquid reservoir releasably attached to the spray gun by engagement of mateable, non-threaded formations provided on the spray gun and the reservoir. The spray gun has an integral connector boss with a socket for reception of a connector tube of the reservoir. The boss has an external flange at the distal end and the reservoir has hook members separate from the connector tube. The hook members are co-operable with the flange when the connector tube is received in the socket to secure releasably the reservoir to the spray gun. In another arrangement, the connector tube is an interference friction-fit in the socket to secure releasably the reservoir to the spray gun. In yet another arrangement, the connector tube has bayonet lugs co-operable with bayonet grooves in the wall of the socket when the connector tube is received in the socket to
(Continued)

secure releasably the reservoir to the spray gun. In a still further arrangement, the reservoir has an integral spout received in the socket integral with the spray gun and provided with a helical projection co-operable with the underside of a radial lug externally of the socket to secure the reservoir.

11 Claims, 25 Drawing Sheets

Related U.S. Application Data continuation of application No. 10/693,764, filed on Oct. 24, 2003, now abandoned.

(51) Int. Cl.
*F16L 37/252* (2006.01)
*F16L 37/248* (2006.01)
*B65D 41/04* (2006.01)

(52) U.S. Cl.
CPC ........ *B65D 41/0407* (2013.01); *F16L 37/248* (2013.01); *F16L 37/2445* (2013.01); *F16L 37/252* (2013.01)

(58) Field of Classification Search
USPC .................................. 239/310, 318, 345, 600
See application file for complete search history.

(56) References Cited

U.S. PATENT DOCUMENTS

| | | | |
|---|---|---|---|
| 3,211,324 A | 10/1965 | Sapien | |
| 3,236,459 A | 2/1966 | McRitchie | |
| 3,813,115 A | 5/1974 | French | |
| 4,151,929 A | 5/1979 | Sapien | |
| 4,781,311 A | 11/1988 | Dunning et al. | |
| 4,811,904 A | 3/1989 | Ihmels et al. | |
| 5,209,365 A * | 5/1993 | Wood | B05B 7/2408 220/212 |
| 5,582,350 A | 12/1996 | Kosmyna et al. | |
| 5,655,714 A | 8/1997 | Kieffer | |
| 5,803,360 A | 9/1998 | Spitznagel | |
| 6,250,688 B1 * | 6/2001 | Kirby | F16L 49/06 285/148.21 |
| 6,595,441 B2 | 7/2003 | Petrie | |
| 6,820,824 B1 | 11/2004 | Joseph et al. | |
| 7,837,132 B2 | 11/2010 | Mazooji | |
| 2004/0065755 A1 | 4/2004 | Turnbull | |

FOREIGN PATENT DOCUMENTS

| | | |
|---|---|---|
| DE | 202 02 123 U1 | 3/2003 |
| EP | 0 449 045 | 10/1991 |
| EP | 0 987 060 | 3/2000 |
| FR | 2784314 | 4/2000 |
| FR | 2 798 868 | 3/2001 |
| GB | 1027369 | 4/1966 |
| GB | 1027370 | 4/1966 |
| JP | 01027659 | 1/1989 |
| JP | 11-347462 | 12/1999 |
| NL | 9202138 | 12/1992 |
| NL | 1024774 | 6/2004 |
| WO | WO 1998/32539 | 7/1998 |
| WO | WO 2001/12337 | 2/2001 |
| WO | WO 2002/072276 | 9/2002 |
| WO | WO 2002/085533 | 10/2002 |
| WO | WO 2003/082475 | 10/2003 |
| WO | WO 2004/037433 | 5/2004 |
| WO | WO 2004/437433 | 5/2004 |

* cited by examiner

SPRAYGUN WITH BUILT-IN QUICK-FIT CONNECTOR

This application is a continuation of U.S. Ser. No. 12/685,926 filed Jan. 12, 2010, which is a continuation of U.S. Ser. No. 10/693,764, filed Oct. 24, 2003, which claims priority from GB Serial No. 0224698.1, filed Oct. 24, 2002, GB Serial No. 0305614.0 filed Mar. 12, 2003, and GB Serial No. 0311014.5 filed May 14, 2003, the disclosures of all of which are incorporated by reference in their entireties herein

FIELD OF THE INVENTION

This invention concerns improvements in or relating to liquid spraying apparatus such as a spray gun. More especially, the invention relates to the connection between the spray gun and a reservoir containing the liquid to be sprayed. The invention has particular, but not exclusive, application to a releasable connection for detachably mounting the reservoir on the spray gun and to a spray gun adapted for such connection.

BACKGROUND OF THE INVENTION

Spray guns are widely used in vehicle body repair shops when re-spraying a vehicle that has been repaired following an accident. In the known spray guns, the liquid is contained in a reservoir attached to the gun from where it is fed to a spray nozzle. On emerging from the spray nozzle, the liquid is atomised and forms a spray with compressed air supplied to the nozzle. The liquid may be gravity fed or suction fed or, more recently, pressure fed by an air bleed line to the reservoir from the compressed air line to the spray gun.

Traditionally, the liquid is contained in a rigid pot mounted on the spray gun by engagement of complementary screw threads on the pot and gun. In this way, the pot can be removed for cleaning or replacement. Typically, the pot is secured to the gun empty and has a removable lid by means of which the liquid can be added to the pot while attached to the gun. On completion of spraying, the pot can be removed and the gun and pot cleaned for re-use.

With this arrangement, the threads on the gun and pot may be damaged by mis-use, for example if an attempt is made to secure a pot having a non-matching thread. Also, on completion of spraying, careful cleaning is required to remove all traces of liquid from the threads to prevent the threads becoming blocked, for example with dried paint, and to prevent cross-contamination with the liquid next sprayed.

Damaged or blocked threads may render the gun unusable requiring the purchase of a new gun. This adds to costs and is inconvenient if working time is lost because a spare gun is not to hand to continue spraying. Moreover, cleaning of the threads usually requires solvents that are also used to clean the gun and pot. The use of solvents is undesirable from health and safety considerations and causes problems for disposal of the solvent after use.

We have recently developed a system in which the reservoir is disposable after use thereby reducing the amount of cleaning required on completion of spraying. With this system, the reservoir may be filled with the liquid to be sprayed before attaching to the gun. The traditional screw threaded connection requires the reservoir to be rotated several times, typically at least four or five turns, to engage fully the threads and secure the reservoir in a fluid tight manner. This is time consuming and requires considerable care and dexterity on the part of the user to prevent spillage when the reservoir is full of liquid.

In order to reduce these problems we have proposed a system for connecting the reservoir to the spray gun via an adaptor that is screwed into the spray gun and provides a releasable quick-fit connection to the reservoir. For example, the reservoir and adaptor may be provided with bayonet type formations that are engageable with a push-twist action requiring less than one complete turn of the reservoir to connect the reservoir to the gun.

This arrangement enables the reservoir to be attached to and detached from the gun in a simple, efficient manner that reduces the risk of spillage when the reservoir contains liquid and that requires less dexterity on the part of the user.

The provision of the adaptor enables existing guns having a screw thread connection for use with a conventional rigid pot to be converted for use with our system using a disposable reservoir. This has numerous advantages for the user, in particular from the reduced amount of cleaning required on completion of spraying. However, problems can arise if an adaptor having a thread matching the thread on the gun is not to hand, for example if the adaptor is removed for cleaning and lost. The gun cannot then be used with the disposable reservoir and working time may be lost if the user does not have a spare adaptor or a rigid pot that can be screwed into the spray gun without the adaptor. Also, the screw threaded connection between the gun and adaptor is susceptible to damage from mis-use in the same way as the connection between the gun and pot that may result in the gun being unusable.

SUMMARY

The present invention has been made from a consideration of the foregoing problems and disadvantages of the existing arrangements for securing a reservoir to a spray gun.

More particularly, at least some embodiments of the present invention provide an improved connection between a spray gun and reservoir that enables the reservoir to be attached to and detached from the gun in a simple manner that reduces the risk of damage to the gun.

Furthermore, at least one embodiment of the present invention provides such improved connection between the gun and reservoir that allows the reservoir to be attached directly to the gun without additional separate components that may be lost and/or may not match the connections on the gun and reservoir.

Moreover, at least one embodiment of the present invention provides a spray gun adapted for rapid, releasable connection to a reservoir that enables the reservoir to be connected when filled with liquid with less risk of spillage and does not require a high degree of dexterity on the part of the user to connect/disconnect the reservoir.

Additionally, at least one embodiment of the present invention provides a spray gun provided with an integral connector for detachably mounting a reservoir having a mateable connector, and an adapter for converting the spray gun connector for releasably mounting a reservoir provided with a non-mateable connector in a simple manner.

Also, at least one embodiment of the present invention provides a spray gun provided with an integral connector for detachably mounting a reservoir that combines the functions of a lid to close an open end of the reservoir and a fluid connector for transferring liquid from the reservoir to the spray gun in use.

In addition, at least one embodiment of the present invention provides an insert for converting an integral, non-threaded connector socket on a spray gun for mounting a reservoir having a connector that is non-mateable with the connector socket and is compatible with the insert.

Thus, according to one aspect of the present invention, there is provided liquid spraying apparatus comprising a spray gun and a reservoir for a liquid to be sprayed, the reservoir having an outlet connectable to the spray gun to permit the liquid to be withdrawn from the reservoir in use, and the spray gun having integral connector means arranged for non-threaded engagement with co-operating connector means on the reservoir by means of which the reservoir is releasably secured to the spray gun.

As used herein, the term "liquid" refers to all forms of flowable materials that can be applied using a spray gun (whether or not they are intended to colour the surface) including (without limitation) paints, primers, base coats, lacquers, varnishes and similar paint-like materials as well as other materials such as adhesives, sealers, fillers, putties, powder coatings, blasting powders, abrasive slurries, mould release agents and foundry dressings which may be applied in atomised or non-atomised form depending on the properties and/or the intended application of the material and the term "liquid" is to be construed accordingly.

By this invention, the spray gun is provided with an integral non-threaded connector for mating engagement with a co-operating non-threaded connector on the reservoir. In this way, the afore-mentioned problems and disadvantages of a screw-threaded connection between the reservoir and spray gun are avoided and the reservoir can be releasably secured to the spray gun in a simple manner that facilitates rapid connection/disconnection of the reservoir.

As used herein, the term "non-threaded engagement" refers to all forms of releasable connection between two connectors that can be engaged with/disengaged from each other either by relative axial movement and/or by relative angular movement involving less than one complete turn about a connection axis.

In a preferred arrangement, the spray gun has an integral socket adapted for connection to an outlet from the reservoir. The socket provides a through bore leading to an inlet of the spray gun and the outlet from the reservoir communicates with the inlet in a fluid-tight manner when the reservoir is connected to the spray gun for delivering liquid to the spray gun in use.

The socket may be recessed in the body of the spray gun. More preferably, however, the socket is provided in a connector boss arranged to project from the body of the spray gun. In this way, the socket is clear of the body of the spray gun providing improved access for connection of the reservoir.

The connector boss may be formed integrally with the body of the spray gun. For example, the body and boss may be a casting of metal or alloy or a moulding. Alternatively, the connector boss may be formed separately from the body of the spray gun and permanently secured thereto. For example, the connector boss may be welded or adhesively bonded to the body of the spray gun.

In one embodiment, the outlet from the reservoir opens to a connector tube integral with the reservoir, and the connector tube is received in the socket to connect the reservoir to the spray gun. For example, the connector tube may be provided at one end of the reservoir. In one arrangement, the reservoir has a removable lid at one end provided with the connector tube.

The reservoir and spray gun may be provided with mateable formations providing a push-fit connection of the reservoir to the spray gun. For example, the connector tube and socket may be tapered so that the connector tube is an interference friction fit in the socket to retain the reservoir on the spray gun.

Alternatively, the reservoir and spray gun may be provided with mateable formations engageable with a push-twist action that requires less than one complete turn of the reservoir relative to the spray gun.

In one arrangement, the connector tube and socket are provided with bayonet type formations engageable within the bore of the socket. For example, the connector tube may be provided with one or more outwardly extending bayonet lugs or ears co-operable with one or more bayonet grooves in the wall of the bore of the socket. The or each bayonet groove may have an axially extending guide portion to receive the aligned lug or ear leading to a circumferentially extending retention portion to trap and retain the lug or ear to secure the reservoir to the spray gun.

In another arrangement, the spray gun and reservoir are provided with mateable formations engageable externally of the bore of the socket. For example, the reservoir may be provided with one or more hook members separate from the connector tube and arranged to engage the spray gun to secure releasably the reservoir and resist axial separation of the connector tube from the socket.

The or each hook member is preferably locatable over a surface of an external flange of the connector boss. For example, the flange may have a recess arranged to pass the distal end of the aligned hook member, and an adjacent cam lobe arranged to deflect resiliently the hook member on rotation of the reservoir to cause the distal end of the hook member to locate over the surface of the flange to retain the reservoir on the spray gun.

The flange may be provided with a stop so that rotation of the reservoir relative to the spray gun to secure the reservoir is restricted to less than 360 degrees. For example, the stop may provide a quick-fit connection employing a half or quarter turn of the reservoir relative to the spray gun. The stop may comprise an abutment face engaged by the or each hook member.

Alternatively, the reservoir may be provided with an external rib on the connector tube co-operable externally of the socket with the spray gun to secure releasably the reservoir and resist axial separation of the connector tube from the socket. The rib is preferably locatable under a radial lug or projection on the spray gun by inserting the connector tube in the socket and rotating the reservoir relative to the spray gun through less than one complete turn. In a modification, the rib may be provided on the spray gun and the lug on the connector tube.

The rib may have a helical form providing a ramp face co-operable with the lug so that the connector tube is displaced axially into the socket by engagement of the rib with the lug. The rib and lug are arranged so that the reservoir can be secured to the spray gun by rotation relative to the spray gun of less than 360 degrees. The rib may extend for approximately 180 degrees in a circumferential direction.

Preferably, a stop is provided to restrict rotation of the reservoir relative to the spray gun. In this way, overtightening of the connectors is prevented and axial movement of the connector tube into the socket is controlled to ensure a fluid-tight connection is achieved. The stop may comprise an abutment at one end of the rib that is engageable with the lug to block rotation of the reservoir relative to the spray gun. Alternatively, the stop may comprise a second rib axially spaced from the helical rib that is engageable with the lug or the spray gun body to block axial movement of the connector tube into the socket.

A fluid-tight seal may be provided by interference fit of the connector tube in the socket. The interference fit may be assisted by the provision of one or more annular sealing ribs on the connector tube. Alternatively, the socket and/or connector tube may be provided with one or more sealing rings, for example O-rings, arranged to provide a fluid-tight seal.

In another embodiment, a sidewall of the reservoir defines an opening at one end of the reservoir that forms the outlet and the end of the sidewall is received in the socket of the spray gun to connect the reservoir to the spray gun. In this embodiment, the connector boss of the spray gun may be provided with an enlarged head that defines the socket and forms a lid for the reservoir.

In this way, the open end of the reservoir is closed when the reservoir is connected to the spray gun and a separate, detachable lid for the reservoir is not required. As a result, the number of parts for assembly of the reservoir can be reduced and the connection of the reservoir to the spray gun simplified.

In one arrangement, the socket preferably has an annular seat engageable with the end of the sidewall around the opening. The end of the sidewall may be located and retained in the socket by an interference push-fit to secure releasably the reservoir in the socket.

Alternatively, the sidewall and socket may be provided with complementary non-threaded connector formations. The non-threaded connector formations may comprise any of the arrangements described previously, for example mateable formations engageable with a push-twist action internally or externally of the socket such as bayonet formations.

The reservoir may be re-usable. For example, the reservoir may comprise a rigid pot that is removable from the spray gun and cleaned on completion of spraying. Typically, the pot has an openable air vent at the end remote from the connection to the spray gun to allow air to enter as liquid is withdrawn from the pot in use.

More preferably, the reservoir is disposable. For example, the reservoir may comprise an outer container and an inner liner, the liner being collapsible as liquid is withdrawn from the reservoir and separate from the outer container so that the liner can be removed and thrown away after use. Typically, the outer container has an air vent at the end remote from the connection to the spray gun to allow air to enter as liquid is withdrawn from the liner in use The above-described sockets on the spray gun may be provided with an insert for converting the socket for connecting a reservoir having a non-mateable connector. In this way, the spray gun can be adapted to mount reservoirs provided with different connectors in a simple, effective manner. A set of interchangeable inserts may be provided allowing fitment of any selected one of the inserts to provide the socket with any desired connector formation. Preferably, the inserts are plastics mouldings but other materials including metals may be used. Typically, the inserts are nylon mouldings.

In one arrangement the spray gun is provided with an integral retainer formation externally of the socket such that a reservoir provided with a mateable retainer formation can be located and secured to the spray gun by a push-twist action requiring less than one complete turn of the reservoir relative to the spray gun, and the inserts enable the spray gun to be adapted to connect reservoirs provided with conventional screw threaded connectors or other types of connector that are non-mateable with the integral retainer formation on the spray gun.

The inserts may be provided with a retainer formation mateable with that on the spray gun to locate and retain the insert. For example, the inserts may be provided with an external rib co-operable externally of the socket with the retainer formation on the spray gun to secure releasably the insert and resist axial separation of the insert from the socket.

The retainer formation may comprise a radial lug or projection with the rib being locatable on the underside by placing the insert in the socket and rotating the insert relative to the spray gun through less than one complete turn. In this way, the insert can be employed to locate and retain the reservoir and prevent inadvertent or accidental separation of the reservoir from the socket.

The rib may have a helical form providing a ramp face co-operable with the lug so that the insert is displaced axially into the socket by engagement of the rib with the lug. The rib and lug are arranged so that the insert can be secured to the spray gun by rotation relative to the spray gun of less than 360 degrees. The rib may extend for approximately 180 degrees in a circumferential direction. In a modification, the rib may be provided on the spray gun and the lug on the insert.

Preferably, a stop is provided to restrict rotation of the insert relative to the spray gun. In this way, over-tightening of the connectors is prevented and axial movement of the insert into the socket is controlled to ensure a fluid-tight connection is achieved. The stop may comprise an abutment at one end of the rib that is engageable with the lug to block rotation of the insert relative to the spray gun. Alternatively, the stop may comprise a second rib axially spaced from the helical rib that is engageable with the lug or the spray gun body to block axial movement of the insert into the socket.

Alternatively, the inserts may be arranged to block or circumvent the integral retainer formation on the spray gun so that it does not interfere with the connection to the reservoir. For example, the insert may be provided with a recessed portion in which the retainer formation on the spray gun is received by push fit of the insert in the socket. The recessed portion may be provided in a flange that is arranged to extend on either side of the retainer formation to limit rotation of the insert relative to the spray gun. In this arrangement, the insert is preferably an interference fit in the socket to reduce the risk of inadvertent or accidental separation of the insert (and attached reservoir) from the socket.

The spray gun with integral non-threaded connector may also have application for providing a connection to a remote reservoir via a supply line, e.g. tubing, having an appropriate mateable connector for connection to the socket or to an insert for converting the socket to receive a non-mateable connector.

Thus, according to another aspect of the present invention, there is provided a spray gun with an integral socket for connecting a reservoir provided with a mateable connector and a removable insert for converting the socket for connecting a reservoir provided with a non-mateable connector.

The socket may be adapted for non-threaded connection to the reservoir with the insert being arranged to convert the socket for threaded connection to the reservoir.

According to yet another aspect of the present invention, there is provided a spray gun having an integral non-threaded connector for mating engagement with a non-threaded connector on a reservoir to connect releasably the reservoir to the spray gun.

The non-threaded connectors on the spray gun and reservoir may comprise a socket on one of the spray gun and reservoir adapted to receive a mating formation on the other of the spray gun and reservoir.

In one arrangement, the socket is provided on the spray gun and has an internal bore providing an inlet connectable to an outlet of the reservoir. In this arrangement, the outlet of the reservoir may be provided by a connector tube received in the bore of the socket on the spray gun.

The socket may be recessed in the body of the spray gun but more preferably the spray gun has a connector boss that projects from the body of the spray gun in which the socket is formed.

The connectors may be engageable within the bore of the socket to connect releasably the reservoir to the gun. Alternatively, the connectors may be engageable externally of the bore of the socket to connect releasably the reservoir to the gun.

According to a still further aspect of the present invention, there is provided a method of attaching a reservoir to a spray gun comprising providing a body of the spray gun with an integral non-threaded connector, providing the reservoir with a non-threaded connector mateable with the connector of the body, and connecting the connectors to secure releasably the reservoir to the spray gun.

Preferably, the connectors are engageable with a push-twist action requiring less than one complete turn of the reservoir to secure the reservoir to the spray gun. For example, the connectors may be of the bayonet type.

According to a further aspect of the present invention there is provided liquid spraying apparatus comprising a spray gun and a reservoir for a liquid to be sprayed, the reservoir being releasably connectable to the spray gun by means of a quick-fit connector system employing mateable connectors on the spray gun and reservoir wherein the spray gun has a body and the spray gun connector is integral with the spray gun body.

Preferably, the spray gun and reservoir define a connection axis when the reservoir is secured to the spray gun. The mateable connectors may be engaged/disengaged by relative axial movement substantially parallel to the connection axis. Alternatively, the mateable connectors may be engaged/disengaged by a combination of relative axial movement substantially parallel to the connection axis and angular movement of less than 360 degrees about the connection axis.

According to still yet another aspect of the present invention there is provided liquid spraying apparatus comprising a spray gun and a reservoir for a liquid to be sprayed, the reservoir having a sidewall extending from a first end to a second end and defining an opening at the first end, and the spray gun having an integral inlet connector with an enlarged head co-operable with the first end of the reservoir such that the opening is sealed in a fluid-tight manner relative to the head.

The enlarged head of the inlet connector forms a lid for the reservoir. In this way, the open end of the reservoir is closed when the reservoir is connected to the spray gun and a separate, detachable lid for the reservoir is not required. As a result, the number of parts for assembly of the reservoir can be reduced and the connection of the reservoir to the spray gun simplified.

In one arrangement, the head defines a socket to receive the first end of the reservoir. The socket preferably has an annular seat engageable with the first end of the reservoir around the opening.

The first end of the reservoir may be located and retained in the socket by a threaded or non-threaded connection. In one arrangement, the socket and reservoir are provided with complementary screw threads to secure releasably the reservoir. In another arrangement, the reservoir is an interference push-fit in the socket to secure releasably the reservoir. In yet another arrangement, the reservoir and socket are provided with complementary non-threaded connector formations engageable internally or externally of the socket.

The inlet connector may be formed integrally with the spray gun, for example by casting or moulding. Alternatively, the inlet connector may be formed separately and permanently secured to the spray gun, for example by welding or adhesive bonding.

The reservoir may comprise a rigid pot with an openable air vent at the second end to allow air to enter as liquid is withdrawn from the reservoir in use. More preferably, the reservoir comprises an outer container and an inner liner, the liner being collapsible as liquid is withdrawn from the reservoir and separate from the outer container so that the liner can be removed and thrown away after use.

Other features, benefits and advantages of the invention in each of its aspects will be apparent from the following detailed description of exemplary embodiments of the invention with reference to the accompanying drawings.

DETAILED DESCRIPTION OF THE EXEMPLARY EMBODIMENTS

Figures 1, 2:
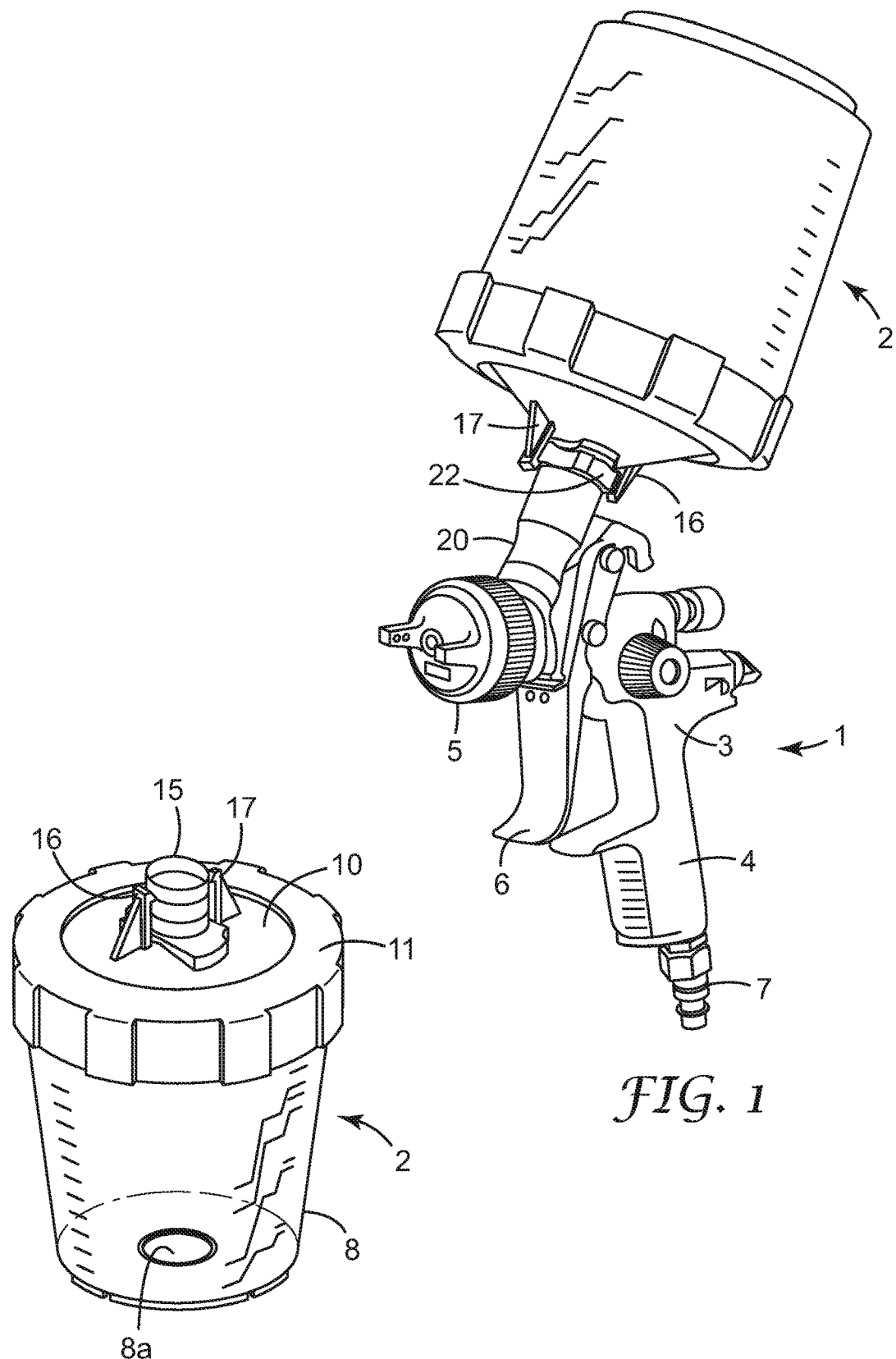
FIG. 1 is a perspective view of liquid spraying apparatus embodying the present invention.
FIG. 2 is a perspective view of the reservoir shown in FIG. 1 separate from the spray gun.

Referring first to FIG. 1 of the accompanying drawings, there is shown liquid spraying apparatus embodying the present invention comprising a gravity fed spray gun 1 and a reservoir 2 releasably connected to the spray gun 1.

The gun 1 comprises a body 3, a handle 4 which extends downwards from the rear end of the body, and a spray nozzle 5 at the front end of the body. The gun 1 is manually-operated by a trigger 6 which is pivotally-mounted on the sides of the gun.

The reservoir 2, which contains paint (or similar material) to be discharged by the gun, is located on the top of the body 3 and communicates with an internal passageway (not visible) which extends through the gun to the nozzle 5.

In use, the gun 1 is connected via a connector 7 at the lower end of the handle 4 to a source of compressed air (not shown) so that, when the user pulls on the trigger 6, compressed air is delivered through the gun to the nozzle 5. As a result, paint delivered under gravity from the reservoir 2 to the nozzle 5 is atomised on leaving the nozzle 5 and forms a spray with the compressed air emerging from the nozzle 5.

Figure 3:
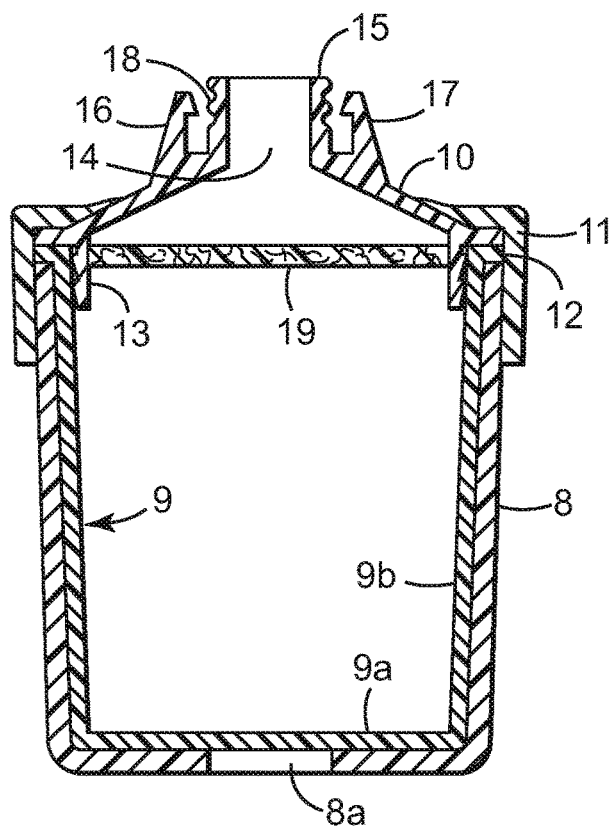
FIG. 3 is a longitudinal section through the reservoir shown in FIG. 2.

Referring now to FIGS. 2 and 3 of the drawings, the reservoir 2 includes an outer container 8, a disposable liner 9, a disposable lid 10 and a collar 11. The liner 9 corresponds in shape to (and is a close fit in) the interior of the container 8 and has a narrow rim 12 at the open end which sits on the top edge of the container 8.

The lid 10 is of conical shape and has a dependent skirt 13 inset from the peripheral edge. The skirt 13 is a push-fit in the open end of the liner 9 to locate the peripheral edge of the lid 10 over the rim 12 of the liner 9. The lid/liner assembly is secured in place by the annular collar 11 that screws onto the container 8 on top of the lid 10.

The lid 10 has a central aperture 14 at the apex that leads to a connector tube 15 providing a fluid outlet and a pair of hook member 16, 17 located either side of the connector tube 15. The hook members 16, 17 are arranged to secure releasably the reservoir 2 to the spray gun 1 and the tube 15 is formed with external annular ribs 18 to provide a fluid-tight seal with the spray gun 1 as described later.

A mesh filter 19 is a push-fit within the skirt 13 and removes particulate material from the paint delivered through the tube 15 to the spray gun 1 in use. Alternatively, the filter 19 may be a push-fit in the tube 15 or may be an integral part of the lid 10.

Figure 4:
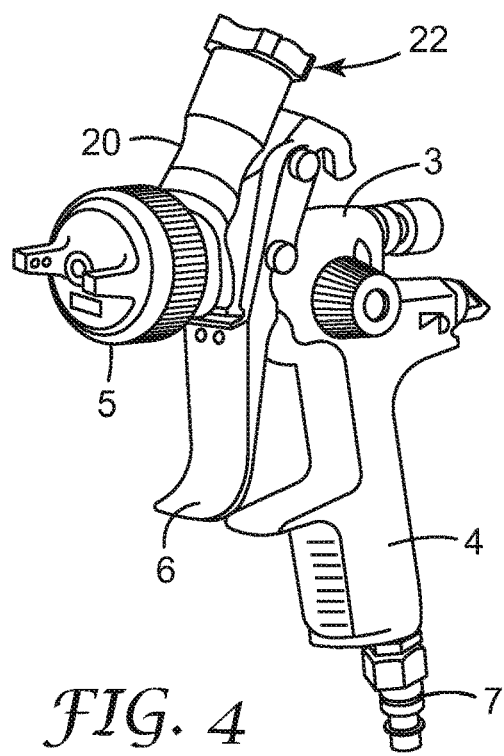
FIG. 4 is a perspective view of the spray gun shown in FIG. 1 separate from the reservoir.
Figure 5:
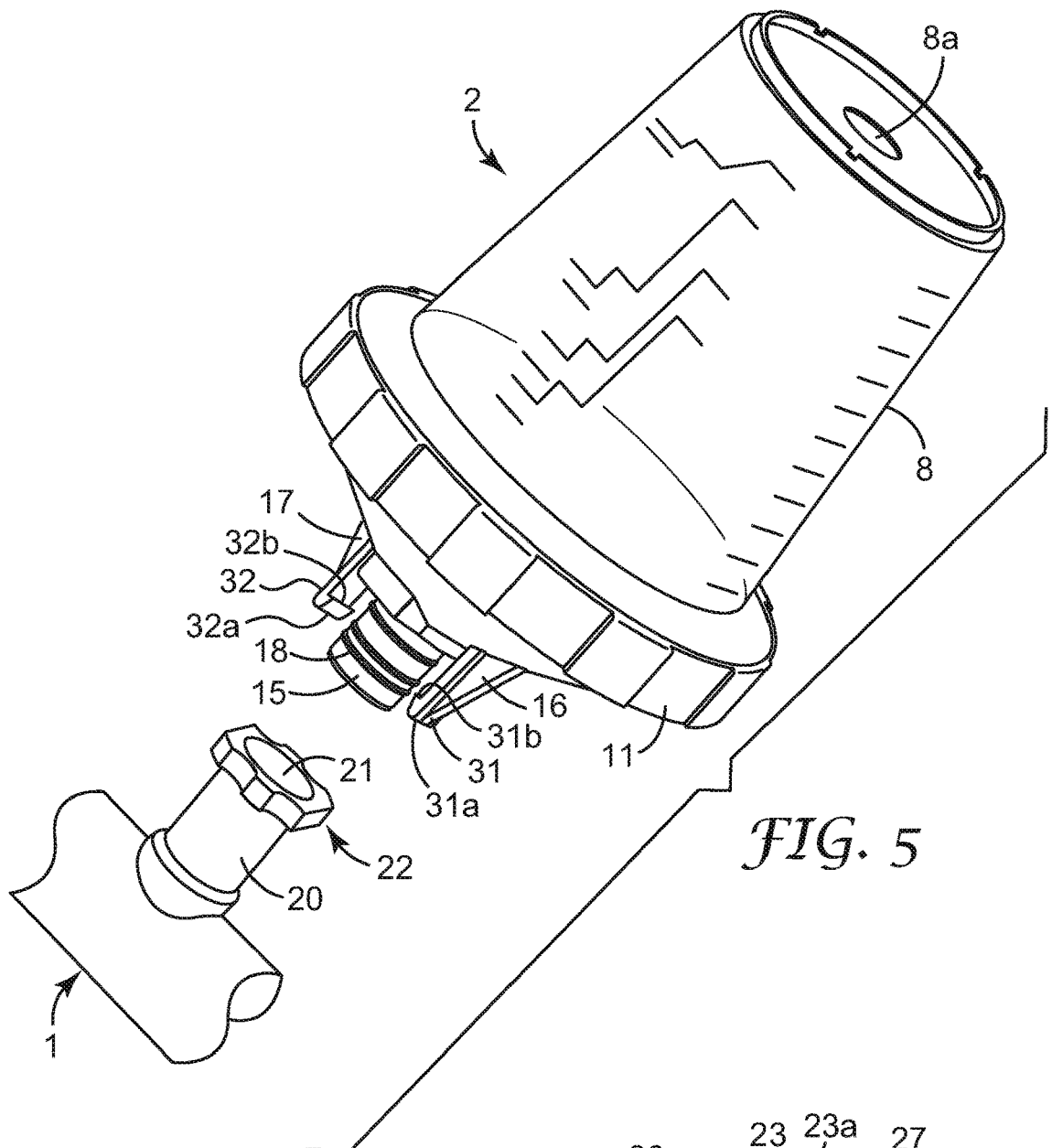
FIG. 5 is an exploded perspective view showing a detail of the connection between the spray gun and reservoir shown in FIGS. 1 to 4.
Figure 6:
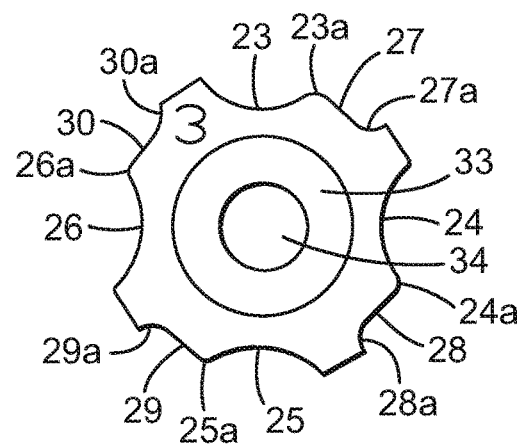
FIG. 6 is an end view of the connector boss of the spray gun with parts removed for clarity.

With reference now to FIGS. 4 to 6, the spray gun 1 is provided with an integral connector boss 20 on top of the body 3. The boss 20 extends upwardly from the body 3 and has a socket 21 shaped to receive the connector tube 15 on the lid 10 of the reservoir 2. The socket 21 terminates at an internal shoulder 33 leading to a bore 34 that extends away from the socket 21 and provides an inlet for delivery of paint from the reservoir 2 to the spray gun 1.

In this embodiment, the boss 20 is formed integrally with the body 3 of the gun 1, for example, the body 3 may be a casting of lightweight metal or alloy. Alternatively, the boss 20 may be formed separately and permanently secured to the body 3, for example by welding so as to form an integral part of the gun 1.

The external ribs 18 of the connector tube 15 provide a fluid-tight seal with the socket 21 and the boss 20 has an external flange 22 at the distal end for co-operating with the hook members 16, 17 to secure releasably the reservoir 2 to the spray gun 1. In an alternative arrangement (not shown), a fluid-tight seal may be obtained by one or more sealing rings, eg O-rings, located in groove(s) on the connector tube 15 or in the wall of the socket 21.

The flange 22 comprises four arcuate recesses 23, 24, 25, 26 (FIG. 6) uniformly spaced in a circumferential direction around the periphery such that the recesses 23, 25 are opposite each other and the recesses 24, 26 are opposite each other.

Each recess 23, 24, 25, 26 leads in a clockwise direction (as viewed in FIG. 6) via a cam lobe 23a, 24a, 25a, 26a at the end of the recess 23, 24, 25, 26 to a flat 27, 28, 29, 30 that terminates in an abutment 27a, 28a, 29a, 30a.

Each hook member 16, 17 comprises an enlarged head 31, 32 at the distal end having a chamfer face 31a, 32a leading to an undercut locking rib 31b, 32b for co-operating with the flange 22.

To secure the reservoir 2 to the spray gun 1, the hook members 16, 17 are aligned with a pair of opposed recesses 23, 25 or 24, 26 in the flange 22. The connector tube 15 is then pushed into the socket 21 so that the enlarged heads 31, 32 of the hook members 16, 17 pass through the aligned recesses 23, 25 or 24, 26.

The reservoir 2 is then rotated relative to the spray gun 1 to cause the hook members 16, 17 ride over the cam lobes 23a, 25a or 24a, 26a and locate the locking ribs 31b, 32b behind the flats 27, 29 or 28, 30. Rotation of the reservoir 2 is restricted by engagement of the hook members 16, 17 with the abutments 27a, 29a or 28a, 30a.

In this way, the reservoir 2 can be secured to the spray gun 1 by a push-twist action requiring less than one complete turn of the reservoir 2 relative to the spray gun 1 about a connection axis defined by the engagement of the connector tube 15 in the socket 21. In this embodiment, the reservoir is rotatable through approximately a quarter turn or less to secure the reservoir to the spray gun.

The reservoir 2 can be removed from the spray gun 1 by a reverse operation in which the reservoir 2 is first rotated to align the enlarged heads 31, 32 of the hook members 16, 17 with the opposed recesses 23, 25 or 24, 26. The reservoir 2 is then pulled to withdraw the connector tube 15 from the socket 21.

The hook members 16, 17 are deflected outwardly by engagement with the cam lobes 23a, 25a or 24a, 26a and snap back on passing the cam lobes when rotating the reservoir 2 relative to the spray gun 1 both to attach and detach the reservoir 2. In this way, when attached to the spray gun 1, the reservoir 2 is positively retained in position when the spray gun 1 is being maneuvered to apply paint to a surface.

The reservoir 2 can also be fitted to the spray gun 1 by a simple push fit by first aligning the hook members 16, 17 with a pair of opposed flats 27, 29 or 28, 30 of the flange 22. The reservoir 2 is then pushed towards the spray gun 1 to cause the chamfer faces 31a, 32a to engage the flange 22.

The enlarged heads 31, 32 are deflected outwardly due to the resilience of the hook members 16, 17 to ride over the flange 22 and snap back after passing the flange 22 to locate the locking ribs 31b, 32b behind the flats 27, 29 or 28, 30. In this way, the reservoir 2 is secured to the spray gun 1. It may be possible to remove the reservoir 2 by a reverse operation if sufficient force is applied to release the locking ribs 31b, 32b.

In use, the reservoir 2 is filled with paint (or other liquid to be sprayed) prior to mounting on the spray gun 1. For this, the liner 9 is pushed inside the container 8. Paint is then put into the liner 9 and, if necessary, mixed with other tinters, hardeners and thinners (solvents). The lid 10 is then pushed into place and the collar 11 is screwed down tightly to hold the lid 10 in position.

The spray gun 1 is then inverted from its normal operating position illustrated in FIG. 1 so that the reservoir 2 can be presented to the spray gun 1 in an upright position to prevent spillage of paint. The reservoir 2 is then secured to the spray gun 1 by a push-twist or push action as described above.

The spray gun 1 can then be returned to its normal operating position for use in the usual way. As paint is withdrawn from the reservoir, the liner 9 collapses in an axial direction from base end 9a towards the lid 10. A vent hole 8a in the base end of the container 8 allows air to enter the container 8 as the liner 9 collapses. Sidewall 9b of the liner 9 folds inwardly in a random, uncontrolled manner as the liner 9 collapses.

After use, when the spray gun 1 is to be cleaned, the spray gun 1 can be re-inverted from its operating position shown in FIG. 1. The airline is disconnected and the trigger 6 actuated briefly to allow paint within the spray gun 1 to drain back into the liner 9 in the reservoir 2. The reservoir 2 is then removed from the spray gun 1 as described above.

As will be appreciated, the integral formations on the gun 1 and reservoir 2 enable the reservoir 2 to be attached to and detached from the gun 1 by a simple action. In this way, the apparatus can be rapidly and easily assembled and disassembled with minimum manual dexterity on the part of the user. Also the risk of spillage when connecting the reservoir 2 containing paint to the gun 1 is reduced. Furthermore, the reservoir 2 can be detachably secured to the gun 1 without a separate adaptor and without engagement of screw threads that can be damaged by mis-use or become blocked by deposits of paint so as to render the gun 1 unusable.

The reservoir 2 can be disassembled when disconnected from the spray gun 1 by removing the collar 11 and pulling out the lid 10 bringing with it the collapsed liner 9. Any paint remaining in the liner 9 may be stored for a short period of time by sealing the connector tube 15, for example with a detachable closure cap (not shown). The lid/liner assembly can then be re-assembled with the container 8 and collar 11 and re-attached to the spray gun 1 to use the remaining paint.

When removed from the container 8, the lid/liner assembly is relatively fragile and susceptible to separation of the liner 9 and lid 10 if mishandled. Accordingly, it is generally only practical to store unused paint for a few hours and any unused paint must be decanted into another container if long term storage is required.

When all the paint has been used or if any remaining paint is no longer required, the lid 10 (including the filter 19) and collapsed liner 9 can be discarded leaving the container 8 and collar 11 clean and ready for re-use with a fresh liner 9 and lid 10. In this way, only the spray gun 1 itself needs to be cleaned. As a result, a reduction in the amount of solvent used for cleaning may be achieved.

Figure 7:
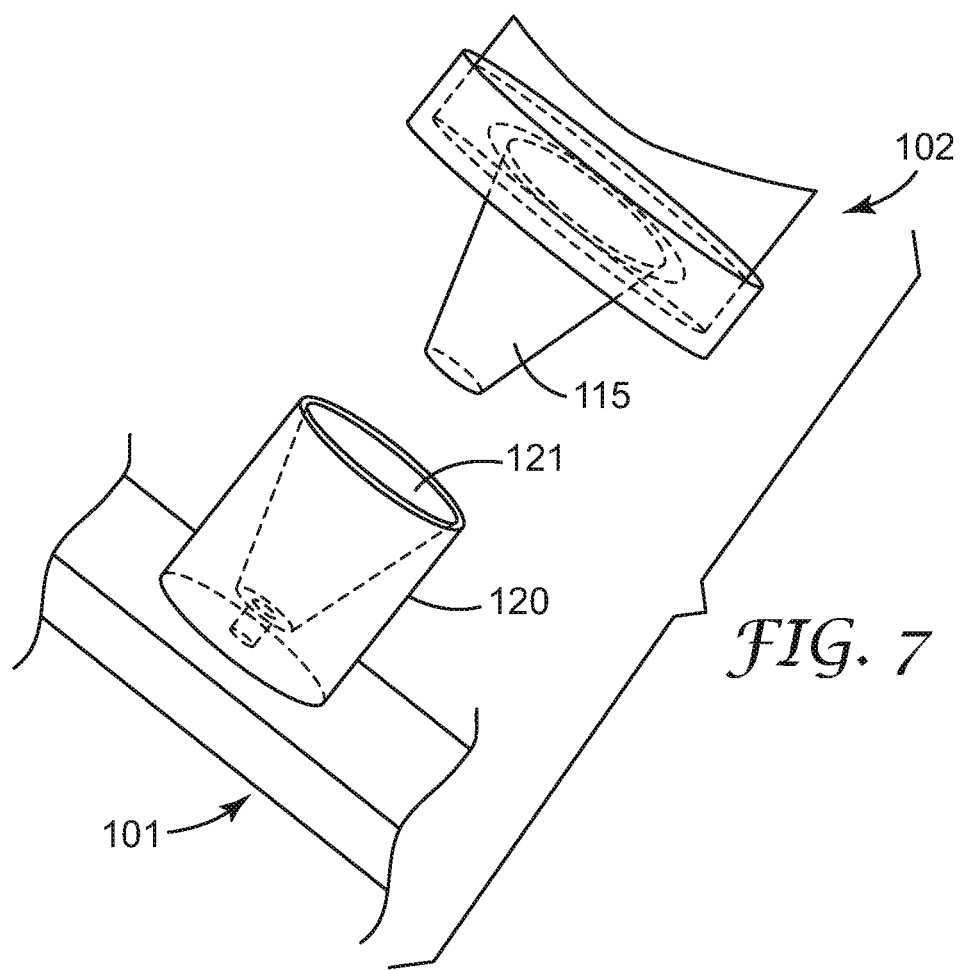
FIG. 7 is an exploded perspective view of an alternative connection between a spray gun and reservoir embodying the present invention.
Figure 8:
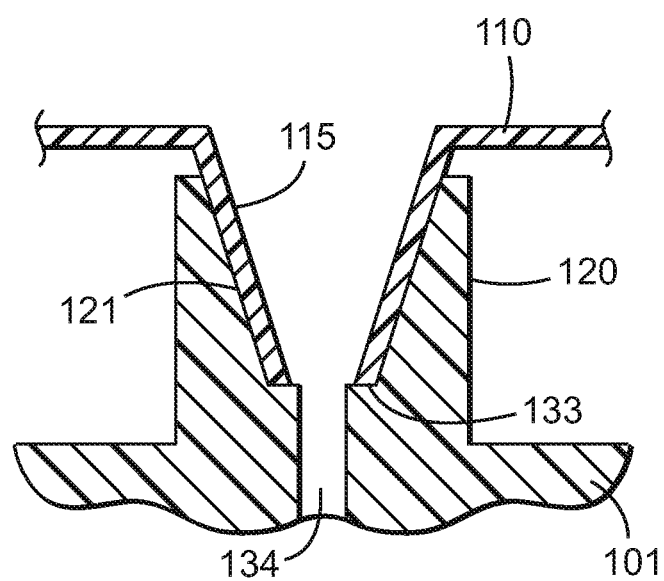
FIG. 8 is a section through the assembled connection of FIG. 7.

Referring now to FIGS. 7 and 8, there is shown another arrangement for releasably securing the reservoir to the spray gun. For convenience, like reference numerals in the series 100 are used to indicate parts corresponding to the previous embodiment.

In this embodiment, the hook members of the previous embodiment are omitted and the reservoir 102 is releasably secured to the spray gun 101 by an interference friction fit between the connector tube 115 of the reservoir 102 and the socket 121 of the spray gun 101.

As shown, the connector tube 115 on the lid 110 of the reservoir 102 is of conical shape tapered towards the distal end and the socket 121 of the connector boss 120 is of conical tapered shape for an interference friction fit of the tube 115 in the socket 121. In this way, the reservoir 102 is secured to the gun 101 by push-fit.

The interference friction fit of the tube 115 provides a fluid-tight seal with the socket 121. If desired, one or more sealing rings (not shown) may be located in groove(s) in the tube 115 or socket 121 to enhance the seal therebetween. The or each sealing ring is compressed by push-fit of the tube 115 that also assists retention of the tube 115 in the socket 121.

In other respects, the construction of the reservoir 102 is generally similar to the previous embodiments and will be understood from the description thereof without further explanation.

Figure 9:
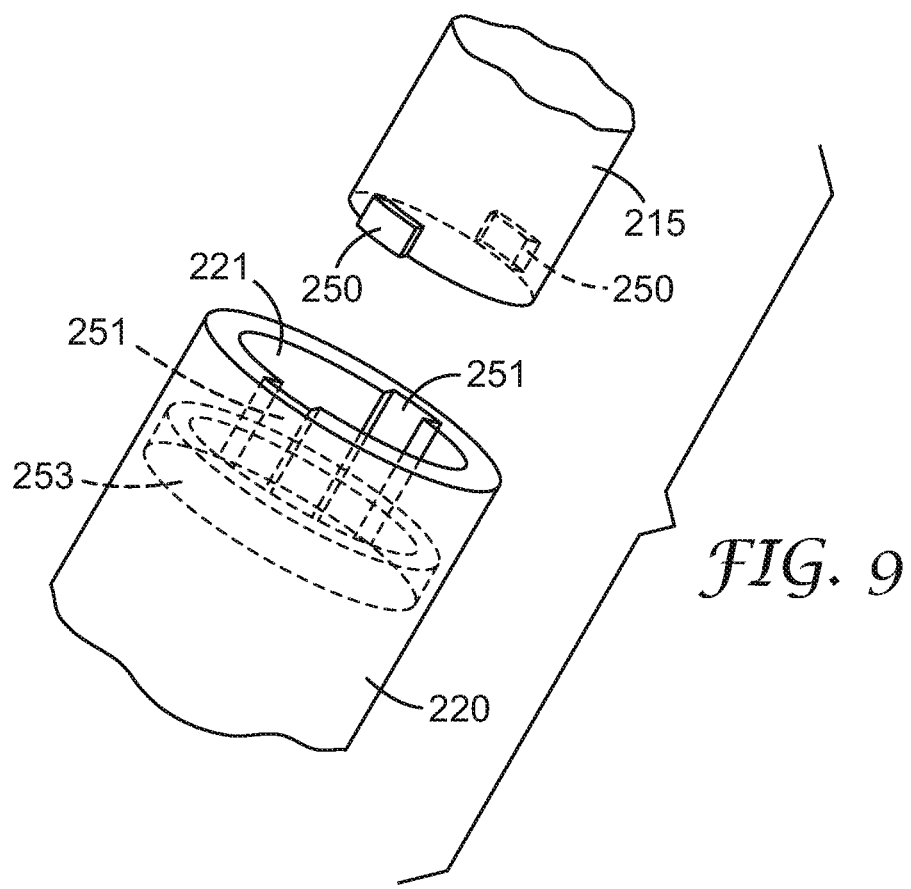
FIG. 9 is an exploded perspective view of another connection between a spray gun and reservoir embodying the present invention.
Figure 10:
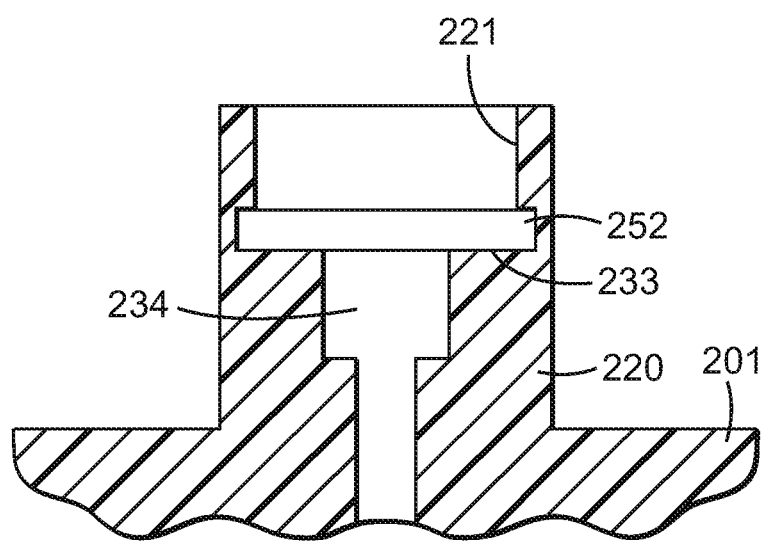
FIG. 10 is a section through the spray gun socket shown in FIG. 9.

Referring now to FIGS. 9 and 10, there is shown yet another arrangement for releasably securing the reservoir to the spray gun. For convenience, like reference numerals in the series 200 are used to indicate parts corresponding to the previous embodiments.

In this embodiment, the hook members of the embodiment of FIGS. 1 to 6 are omitted and the reservoir is releasably secured to the spray gun 201 by co-operating bayonet formations on the connector tube 215 of the reservoir and the socket 221 of the spray gun 201.

As shown, the connector tube 215 is provided at its distal end with opposed outward extending lugs 250 forming one part of a bayonet connection. The connector boss 220 of the spray gun 201 is formed internally with the other part of the bayonet connection. More particularly, the internal wall of the socket 221 is formed with opposed inwardly facing grooves 251 extending axially from the outer free end of the boss 220 and terminating at internal shoulder 233 in a circumferential groove 252.

In this way, the reservoir is secured to the spray gun 201 by aligning the lugs 250 with the axial grooves 251 and pushing the connector tube 215 into the socket 221 until the distal end of the tube 215 contacts the shoulder 233. The reservoir is then rotated to locate the lugs 250 in the circumferential groove 252. In this way, the reservoir is retained by the lugs 250. The reservoir can be detached from the spray gun 201 by a reverse operation.

In other respects, the construction of the reservoir is generally similar to the previous embodiments and will be understood from the description thereof without further explanation.

Figure 11:
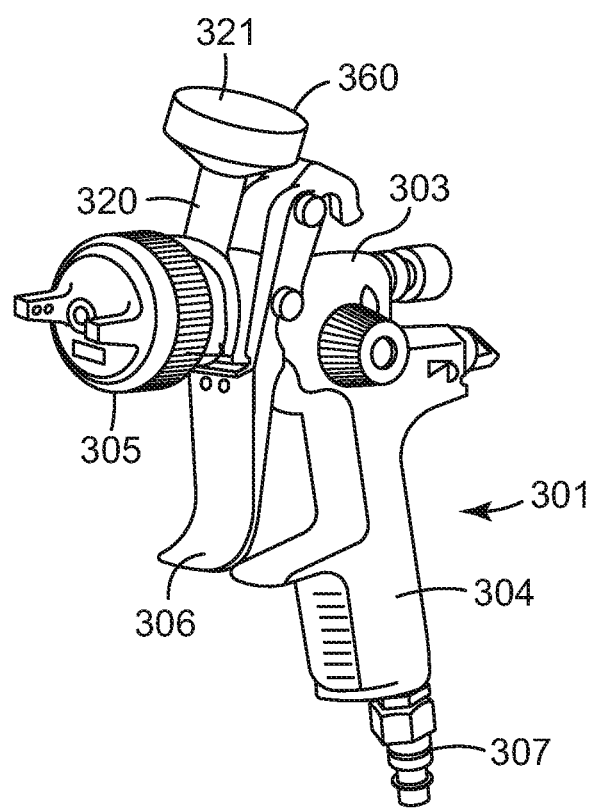
FIG. 11 is a perspective view of a spray gun with an alternative integral connector according to the invention.
Figure 12:
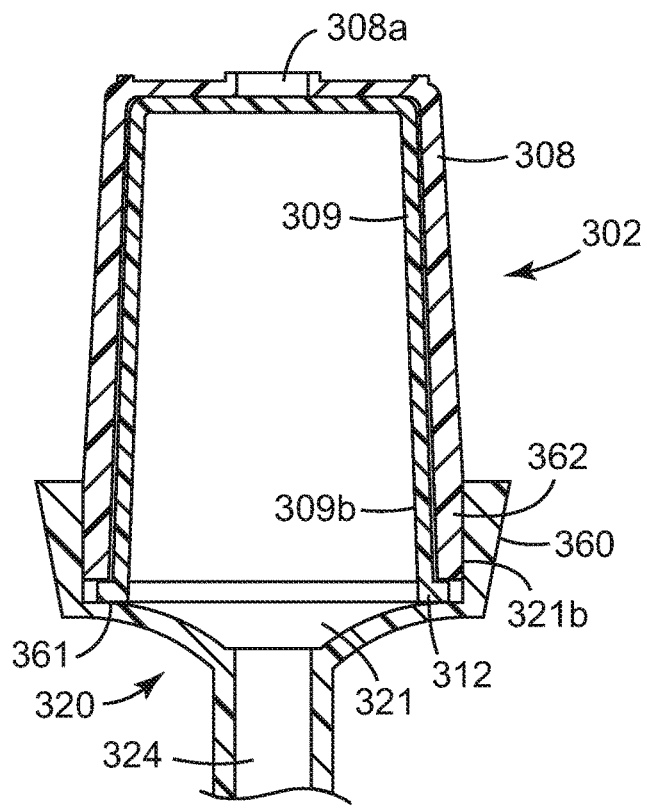
FIG. 12 is a section, to an enlarged scale, showing a reservoir attached to the integral connector of FIG. 11.

Referring first to FIGS. 11 and 12 of the accompanying drawings, there is shown another arrangement for releasably securing the reservoir to the spray gun. For convenience, like reference numerals in the series 300 are used to indicate parts corresponding to the previous embodiments.

In this embodiment, the spray gun 301 is provided with an external connector boss 320 integral with the spray gun body 303. The connector boss 320 extends upwardly from the top of the body 303 and has an enlarged annular head 360 defining a socket 321 shaped to receive the open end of a disposable liner 309 and an outer container 308 for the liner 309.

The rim 312 of the liner 309 locates on an annular seat 361 within the socket 321 with an annular clearance gap 362 between the sidewall 309b of the liner and the opposed sidewall 321b of the socket.

The sidewall 321b of the socket 321 is smooth and tapers slightly towards the base of the socket 321. The liner 309 is held in place by push fit of the open end of the outer container 308 in the clearance gap 362 to secure the rim 312 of the liner 309 between the seat 361 and the open end of the container 308. The container 308 is retained by frictional engagement with the tapered sidewall 321b of the socket 321 and ensures a fluid-tight seal between the liner 309 and the socket 321.

Inwardly of the seat 361, the base of the socket 321 is of conical shape and tapers towards a central opening to a bore 324 of reduced diameter relative to the socket 321 that provides an inlet for delivery of paint from the reservoir 302 to the spray gun 301. In this way, paint flows towards the inlet and dead spaces where paint may become trapped are avoided.

The bore 324 may contain a removable filter (not shown) for filtering paint as it is withdrawn from the reservoir to remove any solid particles. Alternatively or additionally, the paint may be filtered when added to the reservoir 302.

In use, the outer container 308 can be stood upright on its base and the liner 309 inserted in the open end to position the rim 312 over the open end. Paint or other liquid to be sprayed can be added to the liner 309 and mixed therein.

The assembly of the liner 309 and container 308 can then be presented to the socket 321 with the gun 301 in an inverted position so that socket 321 is facing downwards and pushing the open end of the assembly into the socket 321 to secure the outer container 308 and seal the liner 309 relative to the socket 321.

The gun 301 can then be inverted to its normal upright position for spraying with the liner 309 and container 308 being held in place by the frictional engagement of the container 308 in the socket 321. The liner 309 collapses as paint is withdrawn and air is admitted to the interior of the container 308 through the air hole 308a in the bottom of the container 308.

On completion of spraying, the assembly of the liner 309 and container 308 can be detached from the gun 301 and the liner 309 thrown away. A new liner 309 can be fitted in the container 308 and the assembly re-attached to the gun 301 after cleaning the paint contaminated parts of the gun 301 to spray another paint or liquid.

If there is any paint remaining in the liner 309 after spraying, this may be stored in the liner 309 temporarily by attaching a cap (not shown) to close the open end of the liner 309. The cap can be removed and the assembly of the liner 309 and container 308 re-attached to the spray gun 301 to use the paint.

As will now be appreciated, by forming the connector boss 320 on the spray gun 301 with a socket 321 to receive the open end of the liner 309 and by using the outer container 308 to secure the liner 309 by push fit in the socket 321, the connector boss 320 effectively forms the lid of the reservoir 302.

In this way, the number of parts is reduced and assembly of the reservoir 302 and connection to the spray gun 301 is simplified. Also, on completion of spraying, only the liner 309 has to be thrown away and replaced providing a potential cost saving for the end user.

Figure 13:
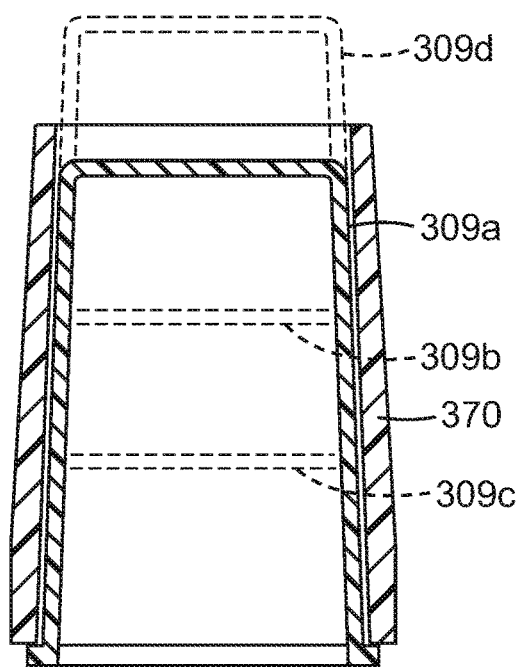
FIG. 13 is a section, similar to FIG. 12, showing a modification to the reservoir.
Figure 14:
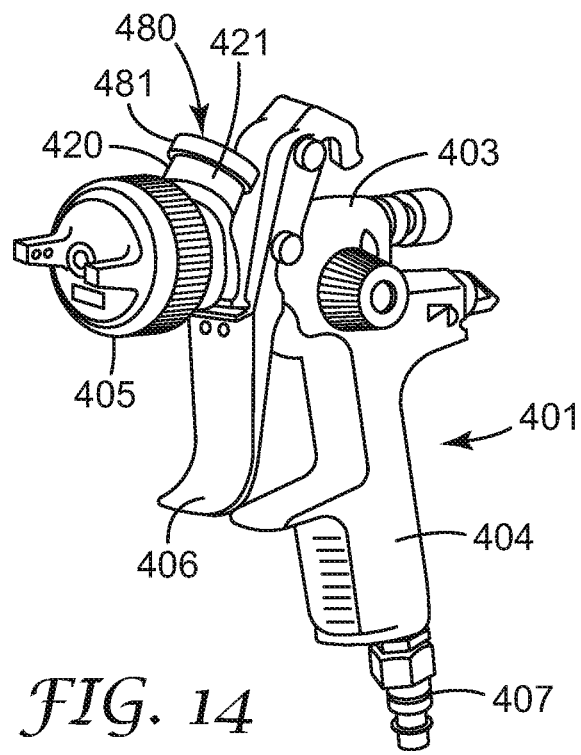
FIG. 14 is a perspective view of a spray gun with an integral connector according to the invention and a removable insert for converting the connector to receive a threaded connector for attaching a reservoir.
Figure 15:
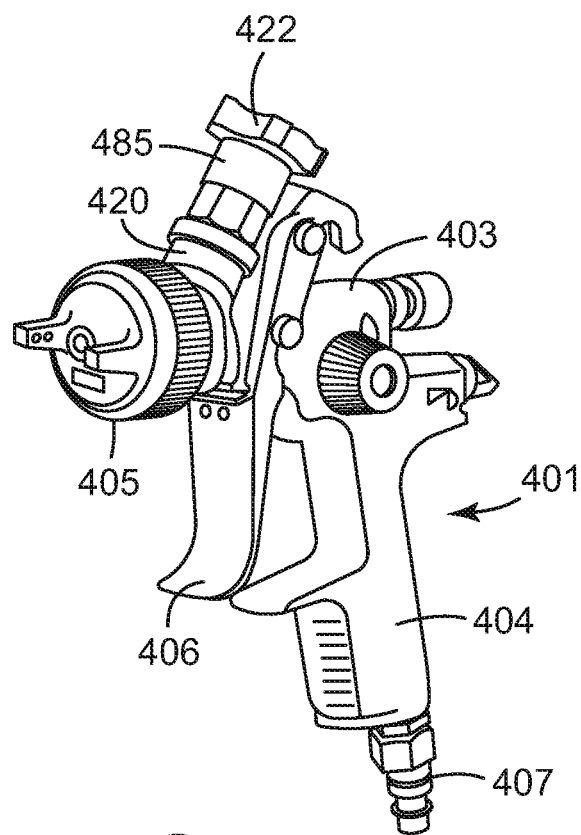
FIG. 15 is a perspective view showing a threaded connector connected to the spray gun shown in FIG. 14.
Figure 16:
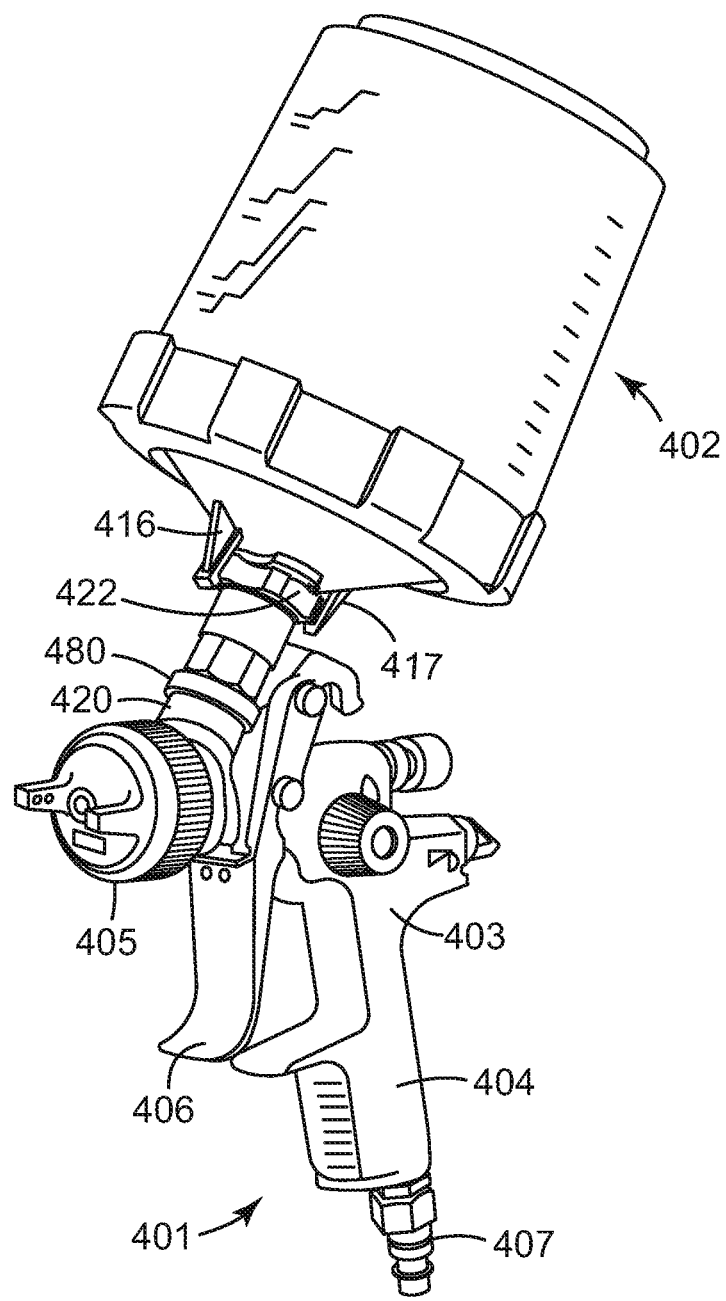
FIG. 16 is a perspective view showing a reservoir connected to the spray gun shown in FIGS. 14 and 15.
Figure 17:
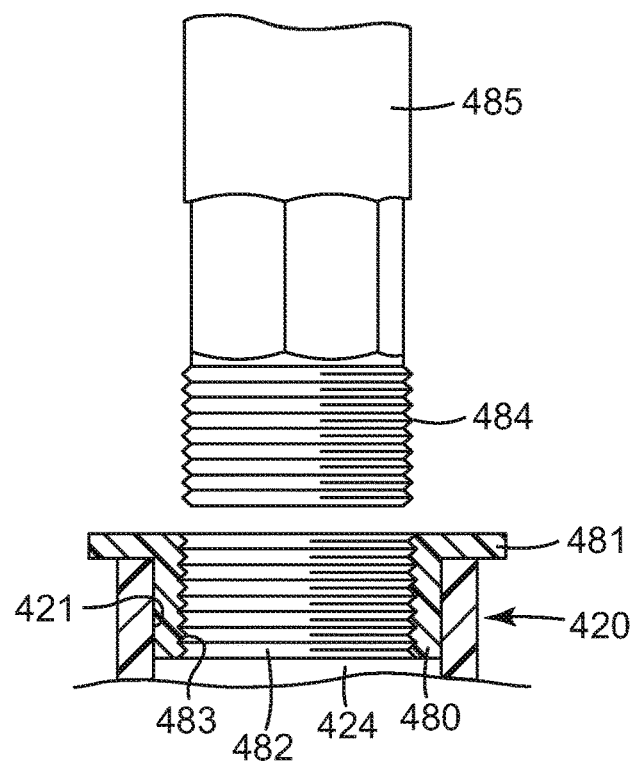
FIG. 17 is a section through the integral connector and insert of the spray gun shown in FIG. 14 and showing the threaded connector of FIG. 15 separate from the insert.

In a modification, shown in FIG. 13, the outer container 308 is replaced by a tubular sleeve 370 open at both ends allowing liners 309a, 309b, 309c, 309d of different length to be secured with a common connector sleeve 370. In this way, the volume of the reservoir 302 can be varied according to the area to be sprayed by selecting and fitting the appropriate size of liner 309a, 309b, 309c, 309d with the same connector sleeve 370 thereby reducing the number of components required to fit reservoirs having a range of volumes.

The sleeve 370 may be used with liners 309 that are contained wholly or partly within the sleeve 370. Thus, in FIG. 13, the sleeve 370 is shown to be longer than each of the liners 309a, 309b, 309c so that each liner 309a, 309b, 309c is protected and supported over the whole of its length by the sleeve 370. This is not essential, however, and the sleeve 370 is also shown in FIG. 13 to be shorter than liner 309d so that the liner 309d projects from the free end of the sleeve 370 and is protected and supported over part of its length only by the sleeve 370.

It will be understood that the socket 321 and container 308 may be provided with any suitable non-threaded connectors to secure releasably the reservoir 302 to the connector boss 320. For example, the socket 321 and container 308 may be provided with co-operating bayonet formations or co-operating snap engageable formations.

Moreover, it will be understood that the connector boss 320 may be used to attach a reservoir to the spray gun 301 that does not have a liner 309. For example, the outer container 308 may have a solid base provided with an openable air hole to allow air to enter as paint is withdrawn.

Referring now to FIGS. 14 to 17 of the accompanying drawings, there is shown another arrangement for releasably securing the reservoir to the spray gun. For convenience, like reference numerals in the series 400 are used to indicate parts corresponding to the previous embodiments.

In this embodiment, the spray gun 401 is provided with an integral connector boss 420 in the form of a socket 421 and a separate detachable insert 480 for reception in the socket 421.

In certain embodiments the insert 480 is a plastics moulding that is releasably secured in the socket 421 by push fit and has an annular flange or collar 481 at the outer end that locates on the rim of the socket 421. The insert 480 is retained in place by friction.

It will be understood, however, that any suitable non-threaded means may be provided to secure releasably the insert 480. For example the socket 421 and insert 480 may be provided with co-operating bayonet formations or snap engageable formations.

The insert 480 has a through bore 482 with an internal screw thread 483 for engagement of a complementary external thread 484 at one end of a mating adaptor 485. The adaptor 485 has a through bore (not shown) and is provided at the other end with an external flange 422 for co-operating with hook members 416, 417 on the reservoir 402 to secure releasably the reservoir 402 to the spray gun 401.

The flange 422 and hook members 416, 417 are similar to the parts shown in FIGS. 5 and 6 by means of which the reservoir 402 can be attached to and detached from the spray gun 401 as described previously.

It will be understood, however, that the reservoir 402 and adaptor 485 may be provided with any suitable complementary co-operating formations to secure releasably the reservoir 402 to the spray gun 401. For example co-operating bayonet formations or snap engageable formations. Alternatively, the reservoir 402 and adaptor 485 may have co-operating screw threads.

As will be apparent, the insert 480 converts the socket 421 to receive a screw threaded member for mounting the reservoir 402. In this embodiment, the screw threaded member is a separate adaptor 485 to which the reservoir 402 is releasably secured. It will be understood, however, that this is not essential and that the screw threaded member could be an outlet of the reservoir that screws directly into the insert 480 without requiring the adaptor 485.

The insert 480 is a separate component and can be removed from the socket 421 if a threaded connection is not required to connect a reservoir to the spray gun 401. In this way, the socket 421 can be adapted for non-threaded connection of a reservoir by removing the insert 480 from the socket 421 or threaded connection of a reservoir by positioning the insert 480 in the socket 421.

In this embodiment, the adaptor 485 screws into the insert 480 within the socket 421. In this way, the screw threaded engagement of the adaptor 485 with the insert 480 may enhance the frictional engagement between the insert 480 and the socket 421. As a result, the reservoir 402 may be secured in a fluid-tight manner that reduces the risk of inadvertent separation of the reservoir 402 from the spray gun 401 as the spray gun 401 is maneuvered in use.

Figure 18:
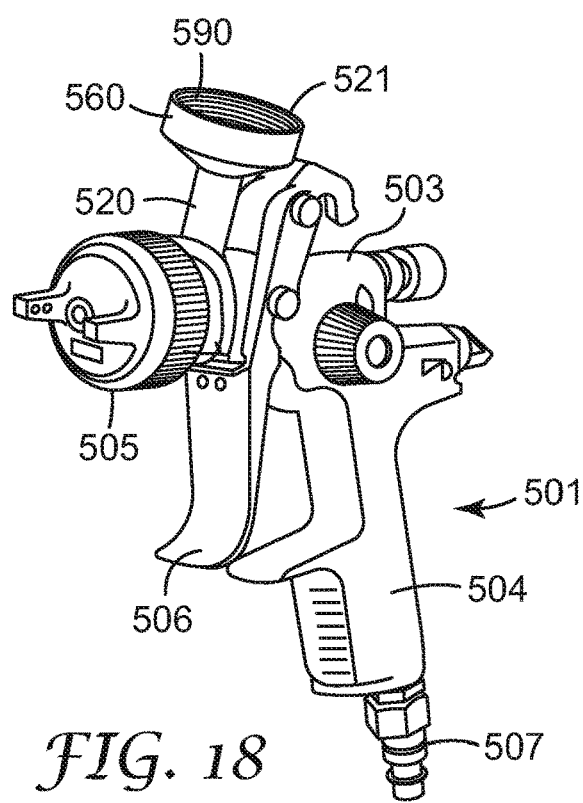
FIG. 18 is a perspective view of a spray gun showing a modification to the connector of FIG. 11 according to another aspect of the invention.
Figure 19:
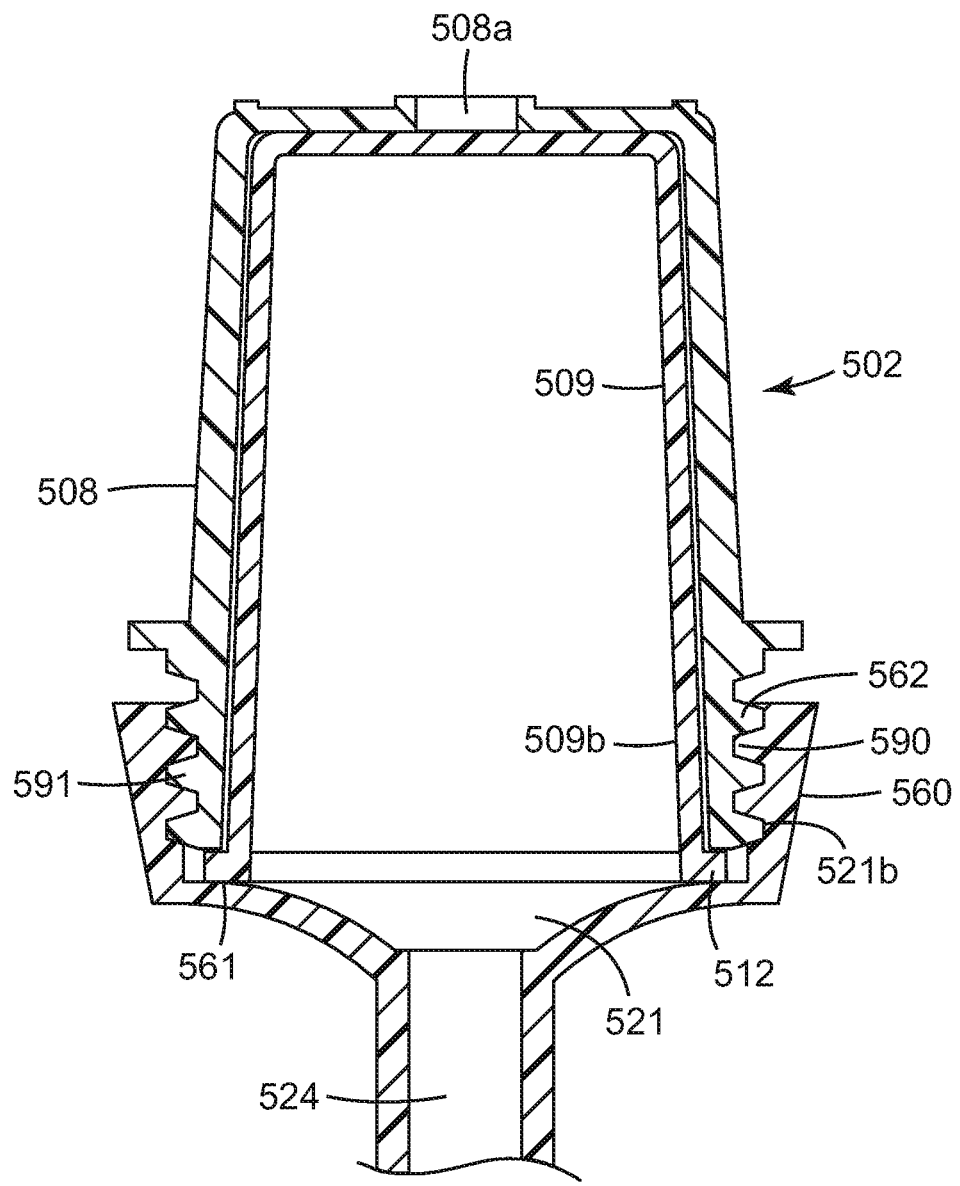
FIG. 19 is a section, to an enlarged scale, showing a reservoir attached to the integral connector of FIG. 18.

Referring now to FIGS. 18 and 19 of the accompanying drawings, there is shown a modification to the arrangement of FIGS. 11 and 12 for releasably securing the reservoir to the spray gun. For convenience, like reference numerals in the series 500 are used to indicate corresponding parts.

In this embodiment, the enlarged annular head 560 of the connector boss 520 is provided with an internal screw thread 590 and the outer container 508 of the reservoir 502 has a complementary external screw thread 591. In this way, the outer container 508 can be screwed into the head 560 to secure the liner 509 in fluid-tight manner relative to the head 560.

The outer container 508 could be replaced by an open-ended sleeve (not shown) for mounting liners of different length to vary the volume of the reservoir 502 as described previously in connection with FIG. 13. Alternatively, the liner 509 could be omitted and the outer container 508 provided with an openable air inlet in the base. In this way, liquid can be added directly to the container 508 for mounting on the spray gun 501.

As will be appreciated, the enlarged head 560 of the connector boss 520 forms a lid for the open end of the reservoir 502 reducing the number of parts and facilitating connection of the reservoir 502 to the spray gun 301 in a simple manner.

In a modification, not shown, the internal screw thread 590 on the head 560 may be replaced by an external screw thread and the outer container 508 replaced by an annular locking ring or collar having an internal screw thread and a concentric inner sleeve or skirt. The inner sleeve is spaced from the internal screw thread and is received in the clearance gap between the head 560 and the liner 509 when the collar is screwed onto the head to secure and retain the liner 509 in the socket 521.

In another modification, not shown, the inlet connector 320, 520 with enlarged head 360, 560 may be a separate component for securing releasably to the spray gun 301, 501 and the invention includes provision of such a connector for mounting a reservoir to the spray gun.

Referring now to FIGS. 20 to 52 of the accompanying drawings, various arrangements for securing a reservoir to a spray gun are depicted. Other details of the construction and operation of the reservoir and spray gun are similar to the previous embodiments and are not described or illustrated further. Where appropriate in the following description, like reference numerals are used in the series 600, 700, 800, 900, 1000 and 1100 to indicate corresponding parts as well as parts similar to parts of previous embodiments.

Figure 20:
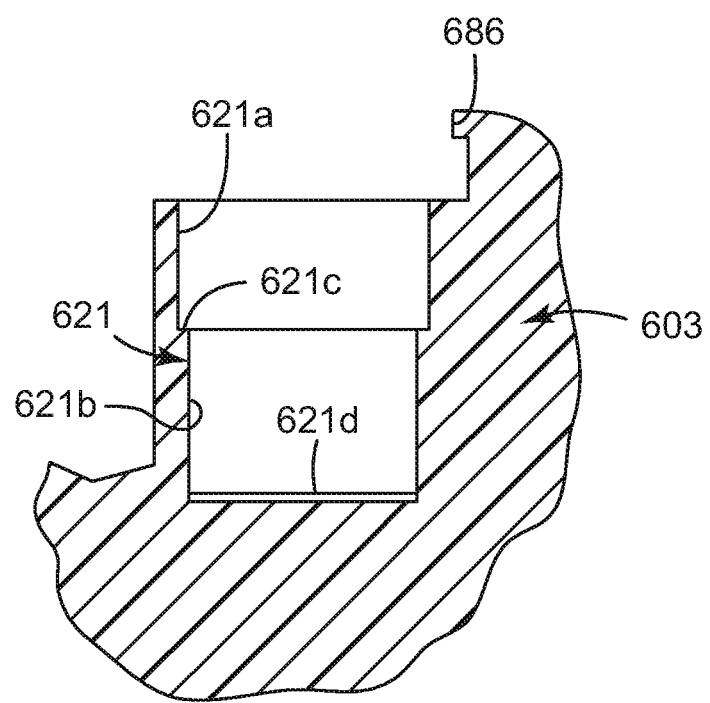
FIG. 20 is a section through an inlet port in the body of a gravity feed spray gun provided with an external retainer formation.
Figure 21:
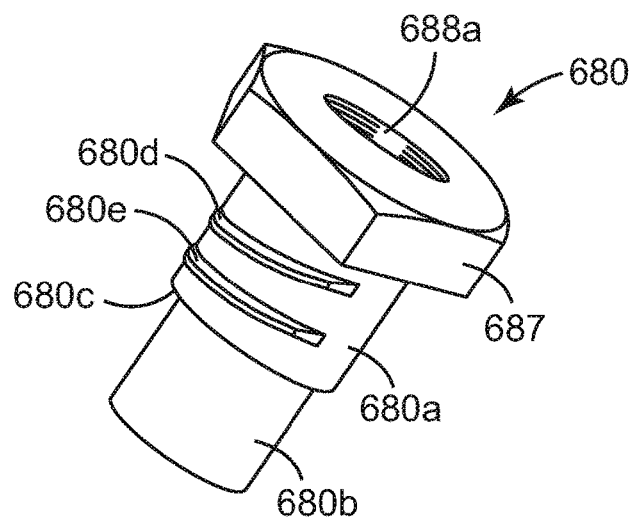
FIG. 21 is a perspective view of an insert adapter for the inlet port shown in FIG. 20.
Figure 22:
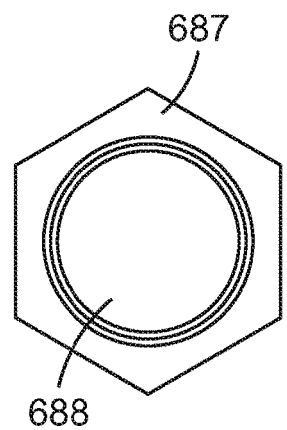
FIG. 22 is a plan view of the insert adapter shown in FIG. 21.
Figure 23:
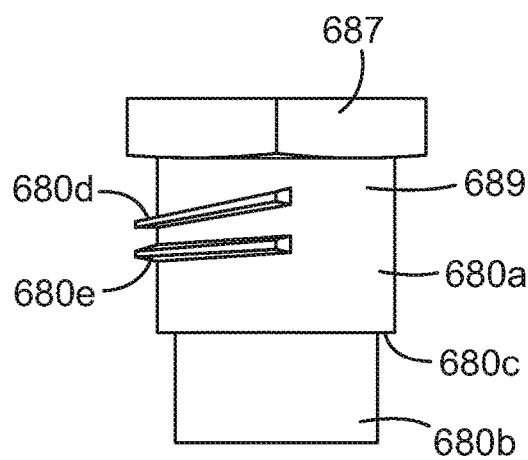
FIG. 23 is a side view of the insert adapter shown in FIG. 21.
Figure 24:
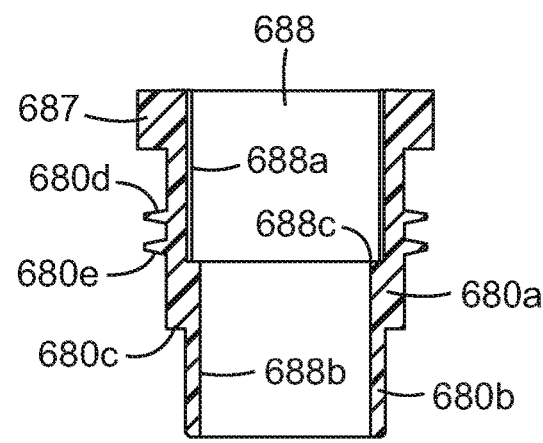
FIG. 24 is a sectional view of the insert adapter shown in FIG. 21.

Referring first to FIG. 20, there is shown a non-threaded socket 621 in the body 603 of a gravity fed spray gun. The socket 621 has a cylindrical outer bore portion 621a and a cylindrical inner bore portion 621b connected by an internal annular shoulder 621c. The inner bore portion 621b is of smaller diameter than the outer bore portion 621a. At the bottom of the socket 621 is a sealing face 621d, the purpose of which will be described later.

Spaced above the socket 612 is a radial lug 686 integral with the gun body 603. The lug 686 extends for part of the circumference of the socket 621 and is set back from the marginal edge of the outer bore portion 621a.

Referring now to FIGS. 21 to 24, there is shown a plastics moulded insert 680, for example a nylon insert 680, for mounting in the socket 621 to convert the socket 621 to receive a threaded connector (not shown) for attaching a paint reservoir. The threaded connector may be an integral part of the reservoir or a separate part to which the reservoir is releasably connected.

The insert 680 is a plastics moulding, for example a nylon moulding, and has a tubular body provided with an external hexagonal flange 687 at one end for engagement with a spanner or the like tool. The insert 680 has a cylindrical upper body portion 680a depending from the flange 687 and connected to a cylindrical lower body portion 680b of reduced diameter by an external annular shoulder 680c.

The lower body portion 680b is sized to be an interference fit in the inner bore portion 621b to provide a fluid tight seal within the socket 621. The upper body portion 680a may be sized to be an interference fit in the upper bore portion 621a but more preferably is a close fit to facilitate insertion of the insert 680 in the socket 621 as described later.

The upper body portion 680a is provided with upper and lower radial projections 680d, 680e of trapezium section that extend for approximately 180 degrees around the circumference of the upper body portion 680a. As shown, the upper projection 680d is also of helical form whereas the lower projection 680e is entirely parallel to the shoulder 680c. In this embodiment, the projection 680d has a pitch of approximately 3 mm but it will be understood this is not essential and that the pitch may be altered to suit any given application.

The insert 680 has a through bore 688 with an upper threaded portion 688a connected to a lower non-threaded portion 688b of reduced diameter by an internal shoulder 688c. The shoulder 688c provides an internal stop to limit engagement of a threaded connector with the upper bore portion 688a to secure a paint reservoir.

In use, the insert 680 is located in the socket 621 by first orienting the insert so that the gap 689 that extends for approximately 180 degrees around the circumference of the upper body portion 680a, between the two ends of the projections 680d, 680e, is aligned with the radial lug 686 on the gun body 603. The insert 680 can then be pushed into the socket 621 until the end of the upper projection 680d furthest from the flange 687 is positioned below the lug 686.

Figure 25:
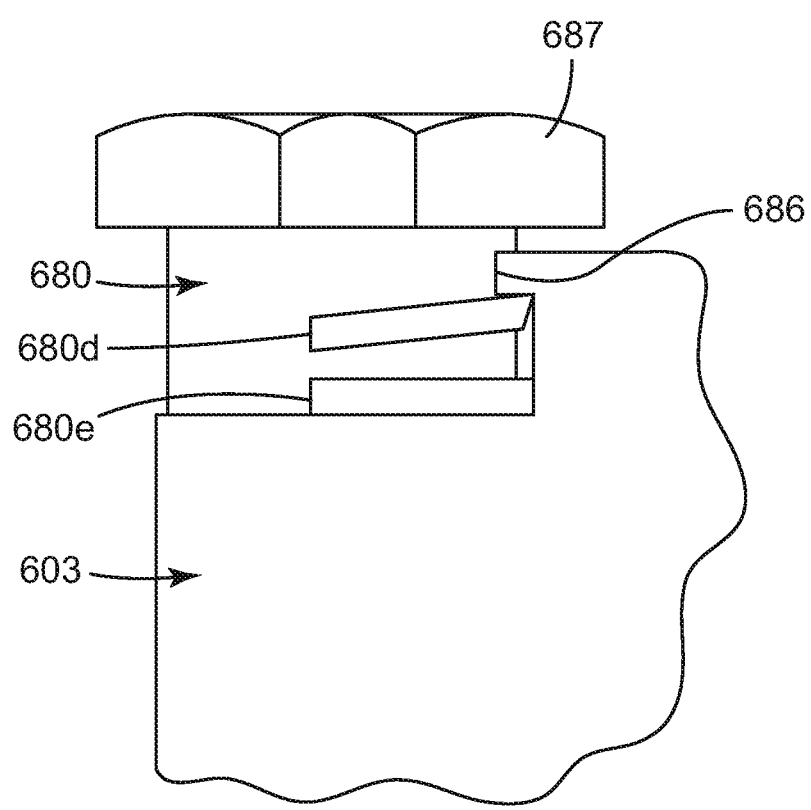
FIG. 25 shows the insert adapter of FIGS. 21 to 24 mounted in the inlet port of the spray gun body shown in FIG. 20.
Figure 26:
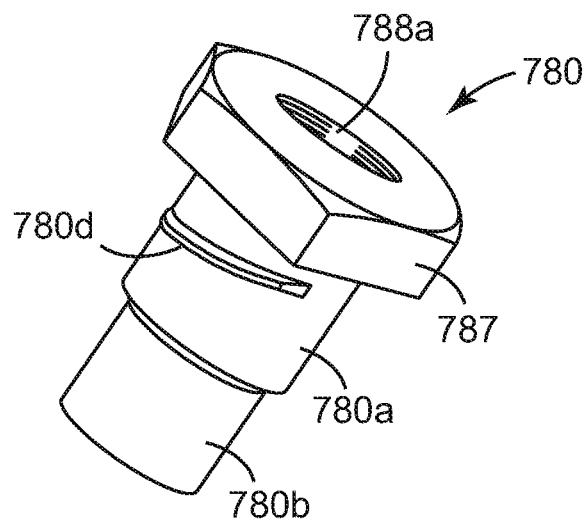
FIG. 26 is a perspective view of an alternative insert adapter for the inlet port shown in FIG. 20.
Figure 27:
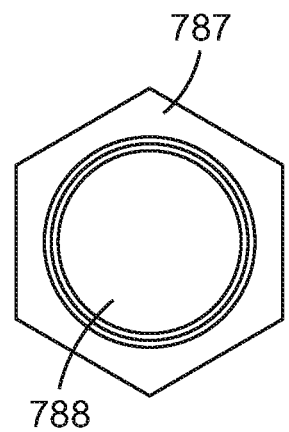
FIG. 27 is a plan view of the insert adapter shown in FIG. 26.
Figure 28:
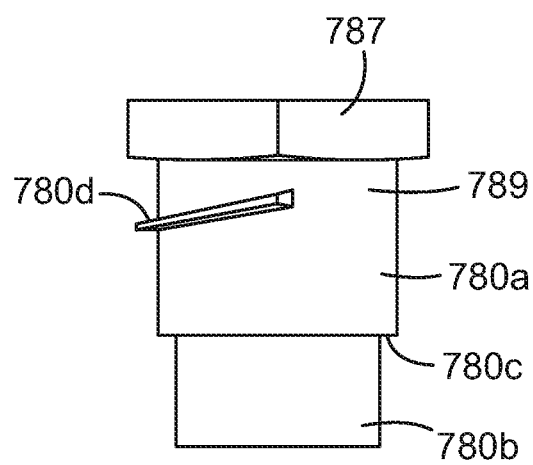
FIG. 28 is a side view of the insert adapter shown in FIG. 26.
Figure 29:
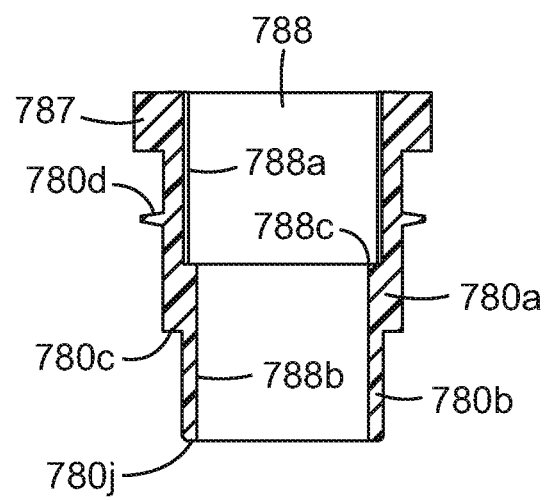
FIG. 29 is a sectional view of the insert adapter shown in FIG. 26.
Figure 30:
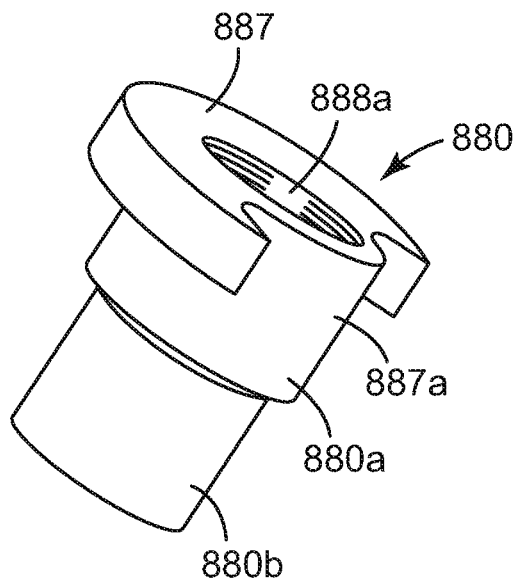
FIG. 30 is a perspective view of another insert adapter for the inlet port shown in FIG. 20.
Figure 31:
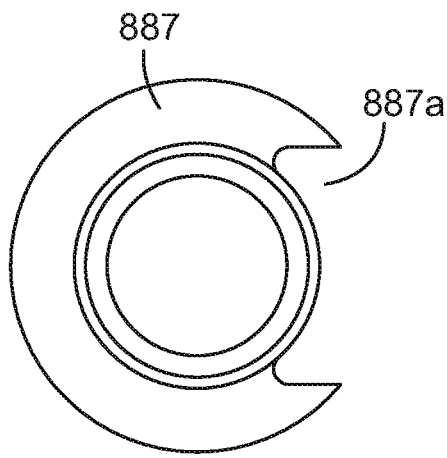
FIG. 31 is a plan view of the insert adapter shown in FIG. 30.
Figure 32:
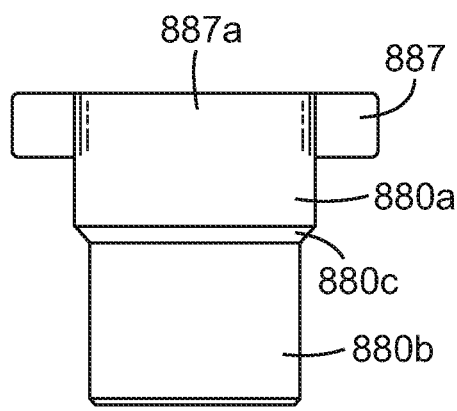
FIG. 32 is a side view of the insert adapter in the direction of arrow A shown in FIG. 31.
Figure 33:
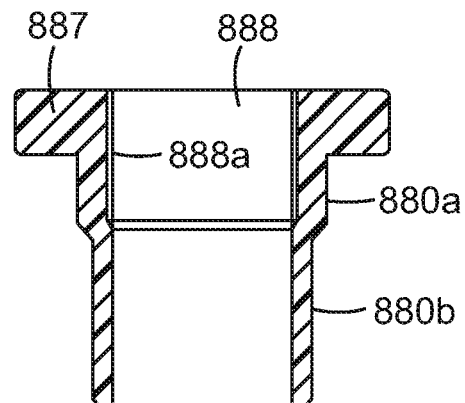
FIG. 33 is a sectional view of the insert adapter shown in FIG. 30.

The insert 680 can then be rotated to engage the upper projection 680d with the underside of the lug 686 as shown in FIG. 25, for example, by engaging the flange 687 with a spanner. The helical form of the upper projection 680d provides a ramp face co-operable with the lug 686 as the insert 680 is rotated.

As a result, the insert 680 is displaced further into the socket 621 until the lower projection 680e engages the gun body 603 around the perimeter of the socket 621.

This requires less than one complete turn of the insert 680. The underside of the lug 686 may be of helical form having a pitch similar to that of the projection 680d to assist axial displacement of the insert 680 by engagement of the projection 680d with the underside of the lug 686.

At this point, the interference fit of the lower body portion 680b in the inner bore portion 621b to provide a fluid-tight seal between the gun body 603 and the insert 680 within the socket 621 is assured.

The insert 680 is also locked in position and prevented from being axially withdrawn from the socket 621 until it is rotated in the reverse direction to re-align the lug 686 with the circumferential gap 689 between the ends of the projections 680d, 680e.

With the insert 680 located and secured in place, the paint reservoir can be secured to the spray gun by means of a threaded connection to the threaded bore portion 688a of the insert 680. If desired, the insert 680 may be held in place while the paint reservoir is attached to or removed from the spray gun by gripping the flange 687 with a spanner or other suitable tool. The threaded connection may be provided as an integral part of the reservoir or by a separate adaptor to which the reservoir can be releasably connected.

As will be appreciated, the lower projection 680e provides a stop to limit displacement of the insert 680 into the socket 621 and prevent the insert 680 being damaged by rotation beyond that required to secure the insert 680 and provide an effective seal within the socket 621. Furthermore, the insert 680 is prevented from rotating as the connector is screwed into the bore 688a by engagement of the projections 680d, 680e with the lug 686 and the gun body 603 respectively.

Figure 51:
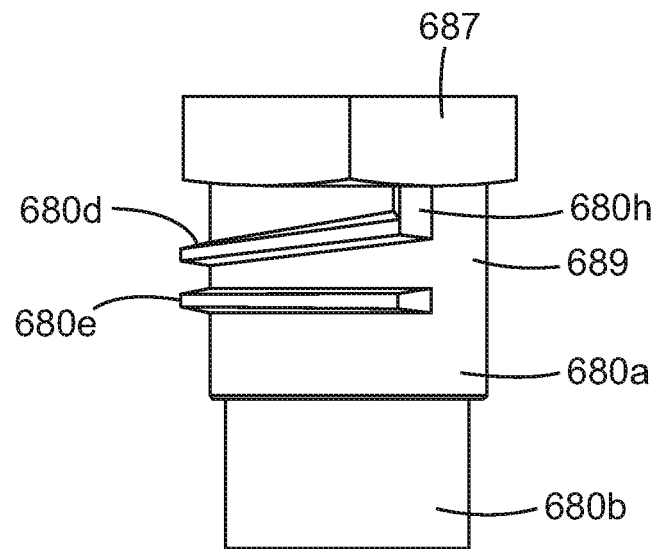
FIG. 51 is a side view showing a modification to the insert of FIGS. 21 to 24.
Figure 52:
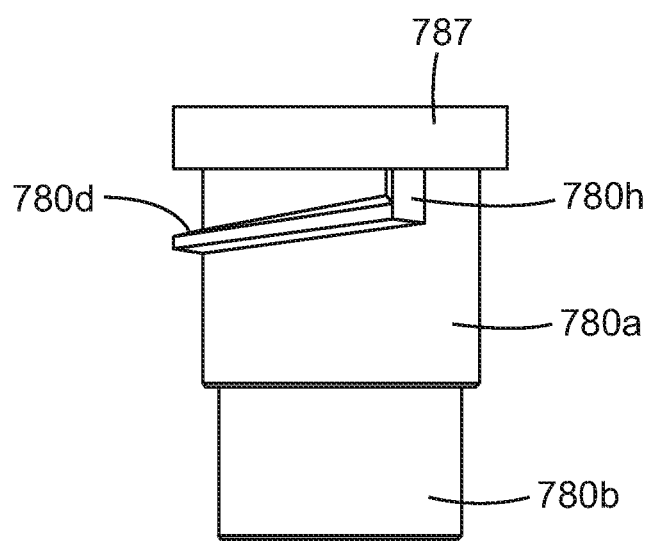
FIG. 52 is a side view showing a modification to the insert of FIGS. 26 to 29.

In a modification shown in FIG. 51, an axial abutment 680h is provided at the upper end of the helical projection 680d. The abutment 680h provides an end stop co-operable with the lug 686 to limit rotation of the insert 680 relative to the lug 686 and prevent over-tightening when the insert 680 is secured in the socket 621.

In another modification (not shown), the lug 686 may be extended further around the circumference of the socket 621 with a corresponding reduction in the length of the projections 680d, 680e on the insert 680 so that the lug 686 can pass through the gap between the ends of the projections.

In another modification (not shown), the projection 680e may be positioned above the projection 680d so that the lug 686 is received between the projections 680e, 680d with the projection 680e again acting as a stop to limit axial movement of the insert 680 into the socket 621 by engagement with the lug 686. Alternatively or additionally, the helical projection 680d may be provided with an end stop as described above to limit rotation of the insert 680 relative to the lug 686. Alternatively, the gap between the upper and lower surfaces of the projections 680d, 680e may reduce sufficiently to limit rotation of the insert 680 relative to the lug 686.

Referring now to FIGS. 26 to 29, there is shown another plastics moulded insert 780 generally similar to the insert 680 above-described.

As shown, the insert 780 has an annular flange 787 at one end and a helical projection 780d on the upper body portion 780a for co-operating with the radial lug 686 on the gun body 603 as described above. The lower projection 780e is omitted and the lower body portion 780b is of increased length and is a close fit rather than an interference fit in the inner bore portion 621b to facilitate insertion of the insert 780 in the socket 621.

In use, the insert 780 is inserted into the socket 621 by aligning lug 686 with the circumferential gap 789 between the ends of the projection 780d and rotated to locate the projection 780d under the lug 686 on the gun body 603 as described above. The insert 780 can then be rotated by engaging the flange 787 with a suitable tool or when screwing the connector for the paint reservoir (not shown) into the insert 780.

On being rotated, the insert 780 is displaced axially into the socket 621 by engagement of the projection 780d with the underside of the lug 686 until a sealing face 780f at the inner end of the insert 780 contacts the sealing face 621d (FIG. 20) at the bottom of the socket 621.

The sealing face 780f may be provided by the insert itself, for example a lip moulded integrally with the insert 780 of the same or softer plastics or by a seal located in the end wall of the insert, for example a rubber O-ring (not shown). Likewise, the sealing face 621d may be provided by the gun body 603 itself, for example an internal abutment shoulder or by a seal located at the bottom of the socket 621, for example a nylon sealing ring or washer.

In a modification (FIG. 52), an axial abutment 780h is provided at the upper end of the helical projection 780d that provides an end stop co-operable with the lug 686 to limit rotation of the insert 780 relative to the lug 686 and prevent over-tightening of the insert 780. In another modification (not shown), the lower body portion 780b may be an interference fit in the inner bore portion 688b to provide a fluid-tight seal without engaging the sealing face 621d at the bottom of the socket 621.

In the above-described embodiments, the helical projection 680d, 780d has a pitch of 3 mm and the co-operating surface on the lug 686 has a similar pitch. It will be understood this is not essential however and that any suitable pitch may be employed. Furthermore, while the helical projections 680d, 780d and, where provided, stop projection 680e extend for approximately 180 degrees to leave a gap 689 of approximately 180 degrees in a circumferential direction for passage of the lug 686, it will be understood that this is also not essential and that the circumferential extent of the projections 680d, 680e, 780d can be altered provided the resulting gap 689 is of sufficient size for the lug 686 to pass through. Referring now to FIGS. 30 to 34, there is shown another plastics moulded insert 880 that can be used to convert the socket 621 for engagement of a threaded connector to secure the paint reservoir.

As shown the insert 880 has an annular flange 887 at one end that is provided with a cut-out 887a of a size and shape to receive the lug 686 on the gun body 603. The helical projection and stop projection of the previous embodiments are omitted from the upper body portion 880a and the lower body portion 880b is sized to be an interference fit in the inner bore portion 621b to provide a fluid-tight seal.

Figure 34:
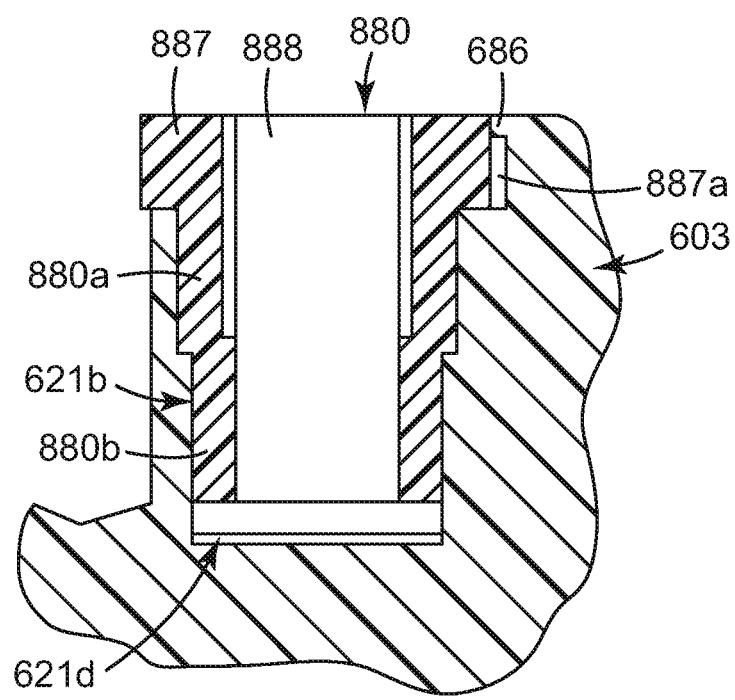
FIG. 34 is a sectional view showing the insert adapter of FIGS. 30 to 33 mounted in the inlet port of the spray gun body shown in FIG. 20.
Figure 35:
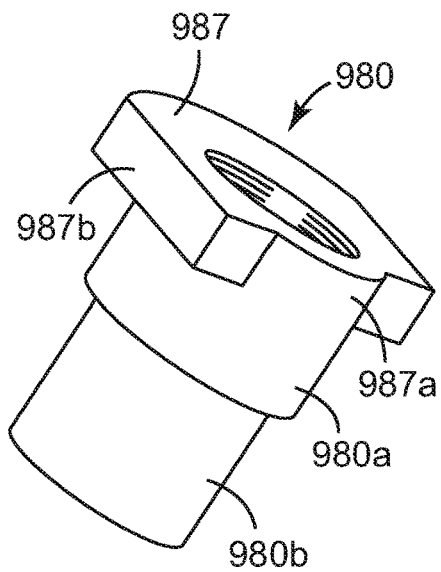
FIG. 35 is a perspective view of another insert adapter for the inlet port shown in FIG. 20.
Figure 36:
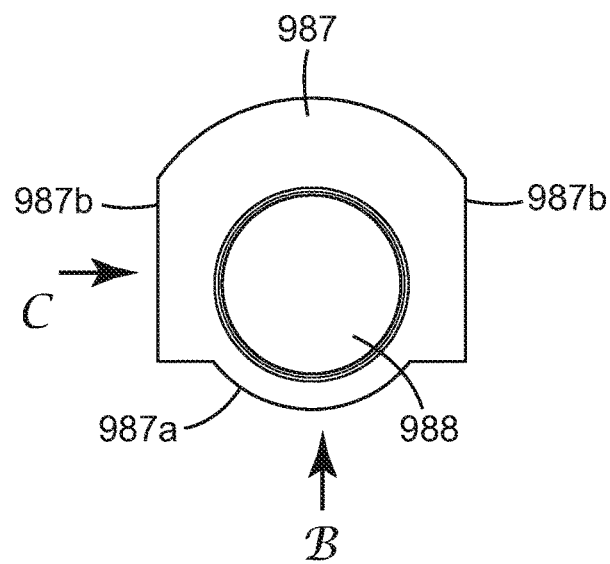
FIG. 36 is a plan view of the insert adapter shown in FIG. 35.
Figure 37:
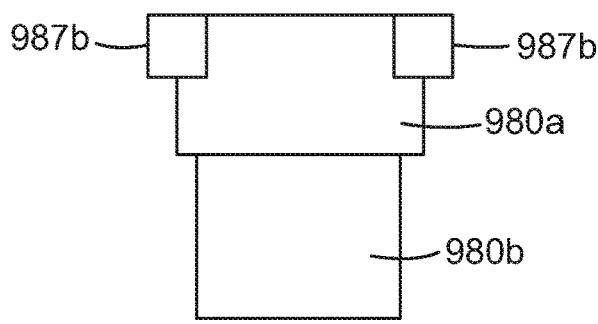
FIG. 37 is a side view of the insert adapter in the direction of arrow B shown in FIG. 36.
Figure 38:
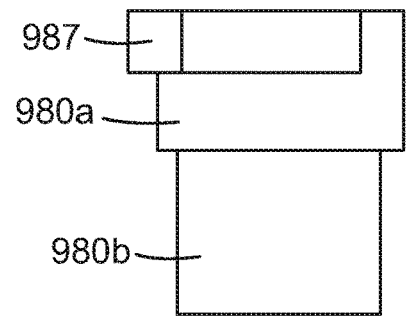
FIG. 38 is a side view of the insert adapter in the direction of arrow C shown in FIG. 36.
Figure 39:
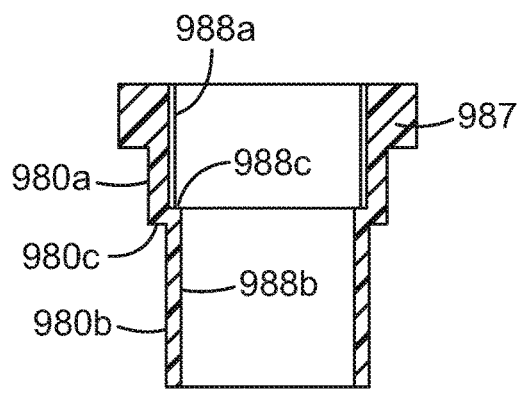
FIG. 39 is a sectional view of the insert adapter shown in FIG. 35.
Figure 40:
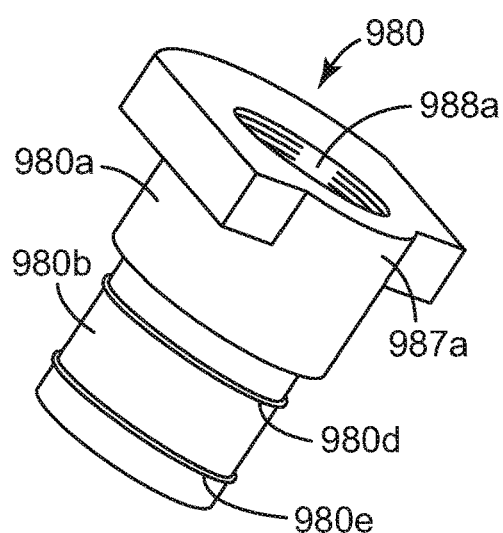
FIG. 40 is a perspective view of another insert adapter for the inlet port shown in FIG. 20.
Figure 41:
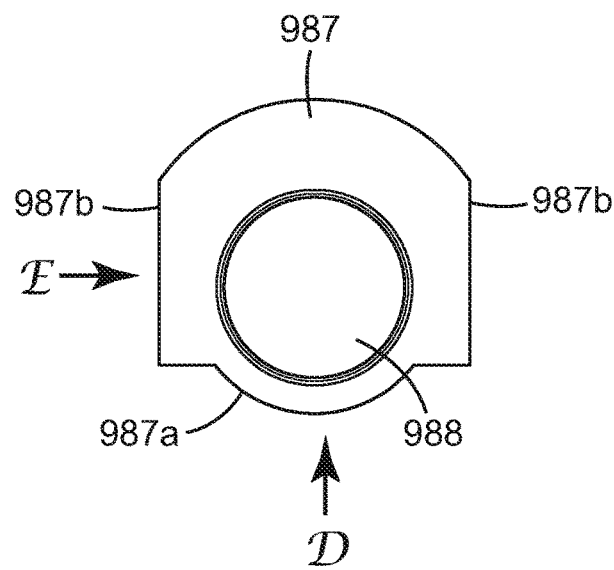
FIG. 41 is a plan view of the insert adapter shown in FIG. 40.
Figure 42:
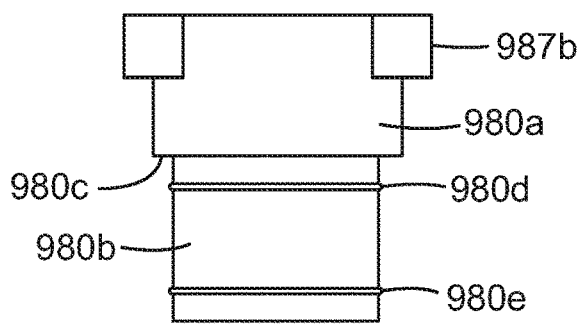
FIG. 42 is a side view of the insert adapter in the direction of arrow D shown in FIG. 41.
Figure 43:
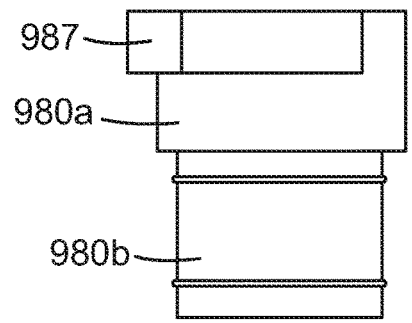
FIG. 43 is a side view of the insert adapter in the direction of arrow E shown in FIG. 41.
Figure 44:
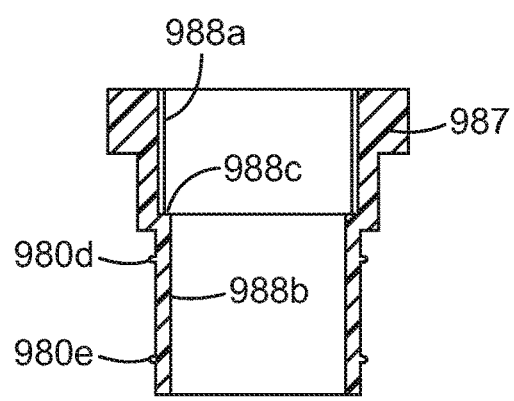
FIG. 44 is a sectional view of the insert adapter shown in FIG. 40.

In use, the insert 880 is positioned with the cut-out 887a aligned with the lug 686 on the gun body 603. The insert 880 is then inserted axially into the socket 621 until the flange 887 is seated on the gun body 603 around the socket 621 and the lug 686 is received in the cut-out 887a as shown in FIG. 34. The insert 880 is then prevented from rotating relative to the gun body 603 when the threaded connector for securing the reservoir is screwed into the insert 880 by engagement of the lug 686 in the cut-out 887a.

As will be appreciated, unlike the previous embodiments, the insert 880 is not axially retained by engagement with the lug 686 and relies on the interference fit of the insert 880 in the socket 621 both to seal and retain the insert 880 in a fluid-tight manner. The interference fit can be enhanced by forming the insert 880 so that the upper body portion 880a will expand when the threaded connector for securing the reservoir is screwed into place.

Referring now to FIGS. 35 to 39, there is shown another plastics moulded insert 980 that can be used to convert the socket 621 for engagement of a threaded connector to secure the paint reservoir.

The flange 987 is provided with a cut-out 987a and is also formed with opposed flats 987b. The cut-out 987a is larger than the lug 686 in a circumferential direction. As a result, the insert 980 can rotate to a limited extent when inserted in the socket 621 and the flats 987b allow the insert 980 to be held with a tool to prevent the insert 980 rotating when the threaded connector for securing the reservoir is screwed into the insert 980.

Again, the insert 980 is not axially retained by engagement with the lug 686 and relies on the interference fit of the insert 980 in the socket 621 both to seal and retain the insert 980 in a fluid-tight manner. The interference fit can again be enhanced by forming the insert 980 so that the upper body portion 980a will expand when the threaded connector for securing the reservoir is screwed into place.

Referring now to FIGS. 40 to 44, there is shown a modification to the insert 980 in which the lower body portion 980b is provided with a pair of axially spaced, annular sealing ribs 980d, 980e. The ribs 980d, 980e are continuous in a circumferential direction and provide a fluid-tight seal with the inner bore portion 621b when the insert 980 is located in the socket 621.

It will be appreciated that the number and arrangement of the sealing ribs 980d, 980e may be altered from that shown and that any of the inserts 680, 780, 880, 980 described herein may be provided with one or more sealing ribs for sealing the insert in the socket 621.

As will now be apparent, each of the inserts 680, 780, 880, 980 above-described converts the non-threaded socket 621 in the gun body 603 to receive a threaded connector for securing a separate paint reservoir. It will be understood, however, that the outlet spout of the reservoir could be adapted in similar manner to each of the inserts to permit the reservoir to be connected directly to the socket of the gun body.

Figure 45:
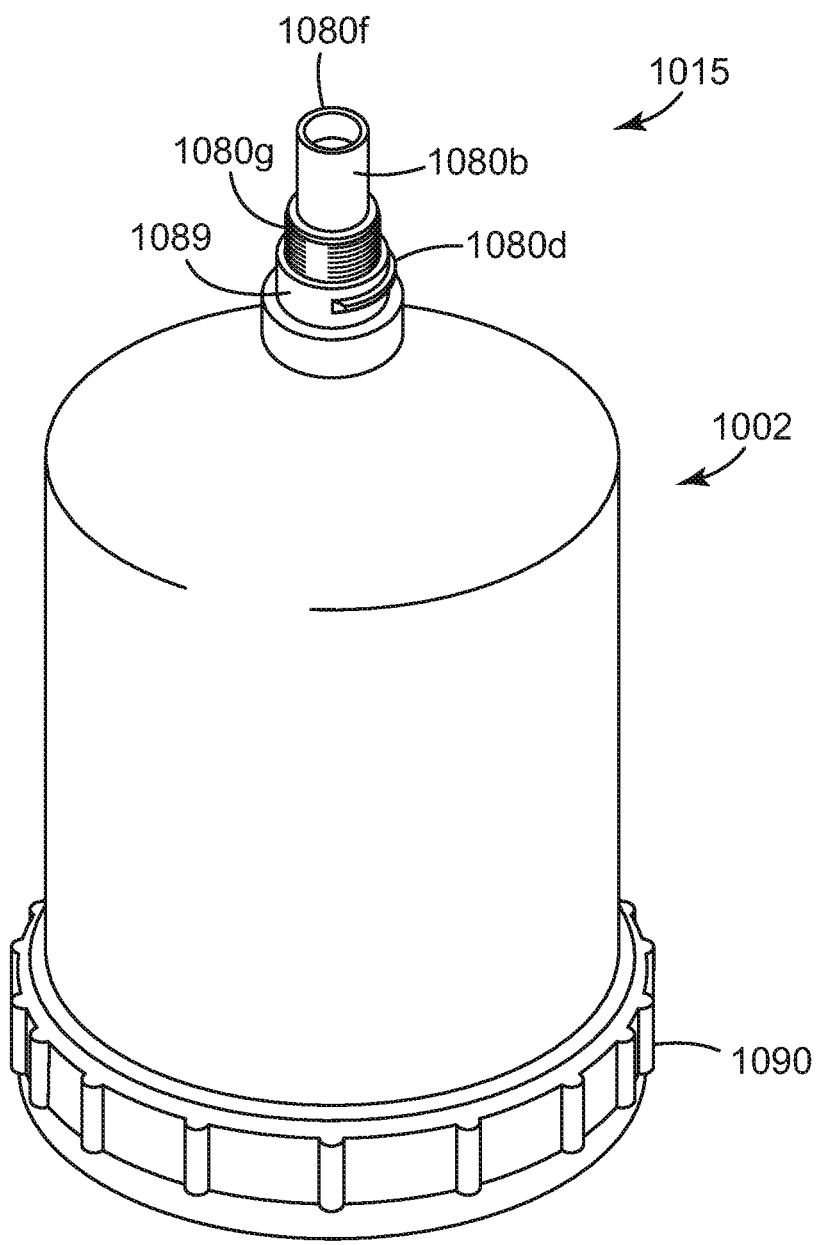
FIG. 45 is a perspective view of a reservoir with integral spout adapted for connection to the spray gun of FIG. 20.
Figure 46:
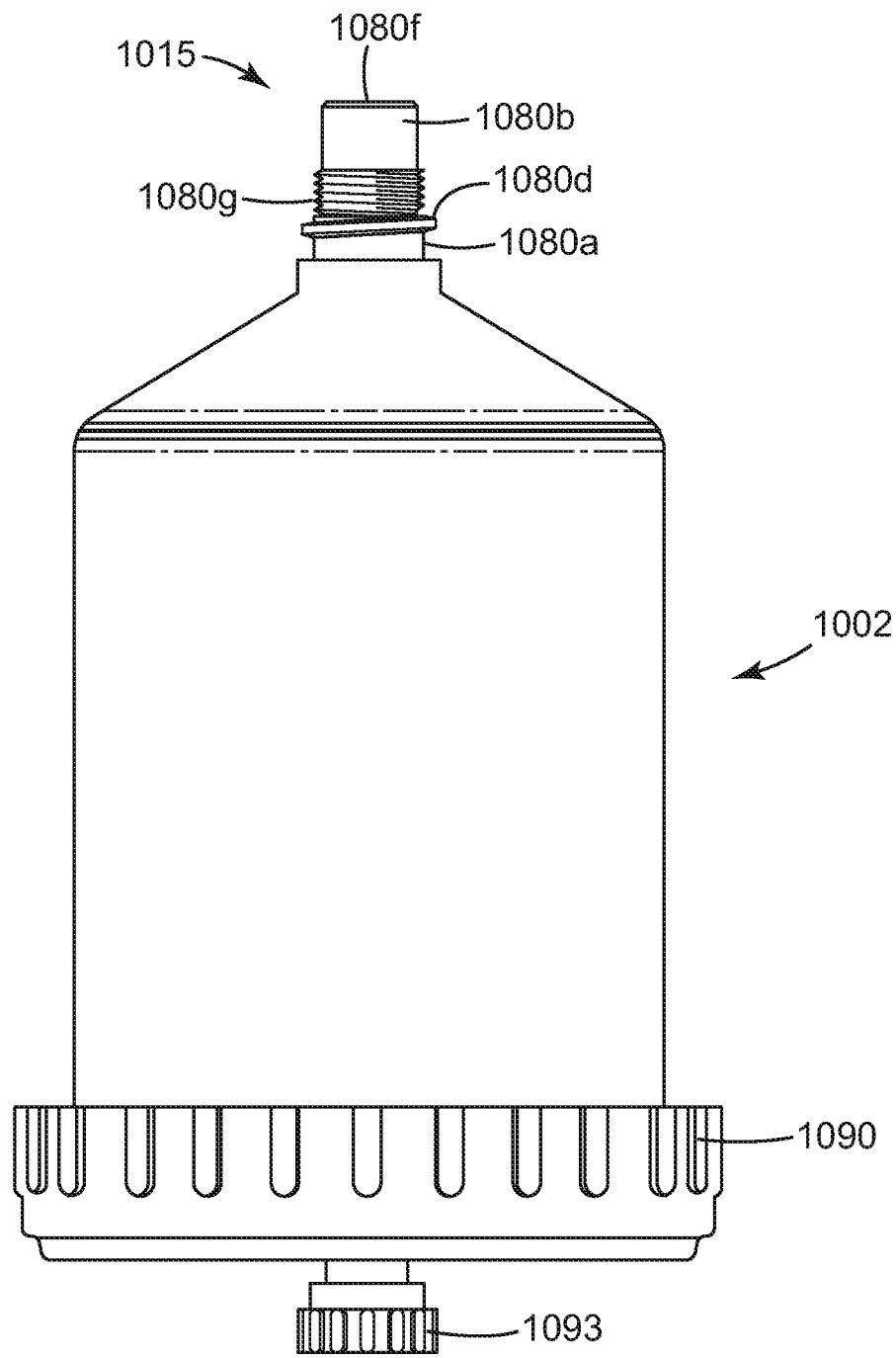
FIG. 46 is a side view of the reservoir shown in FIG. 45.
Figure 47:
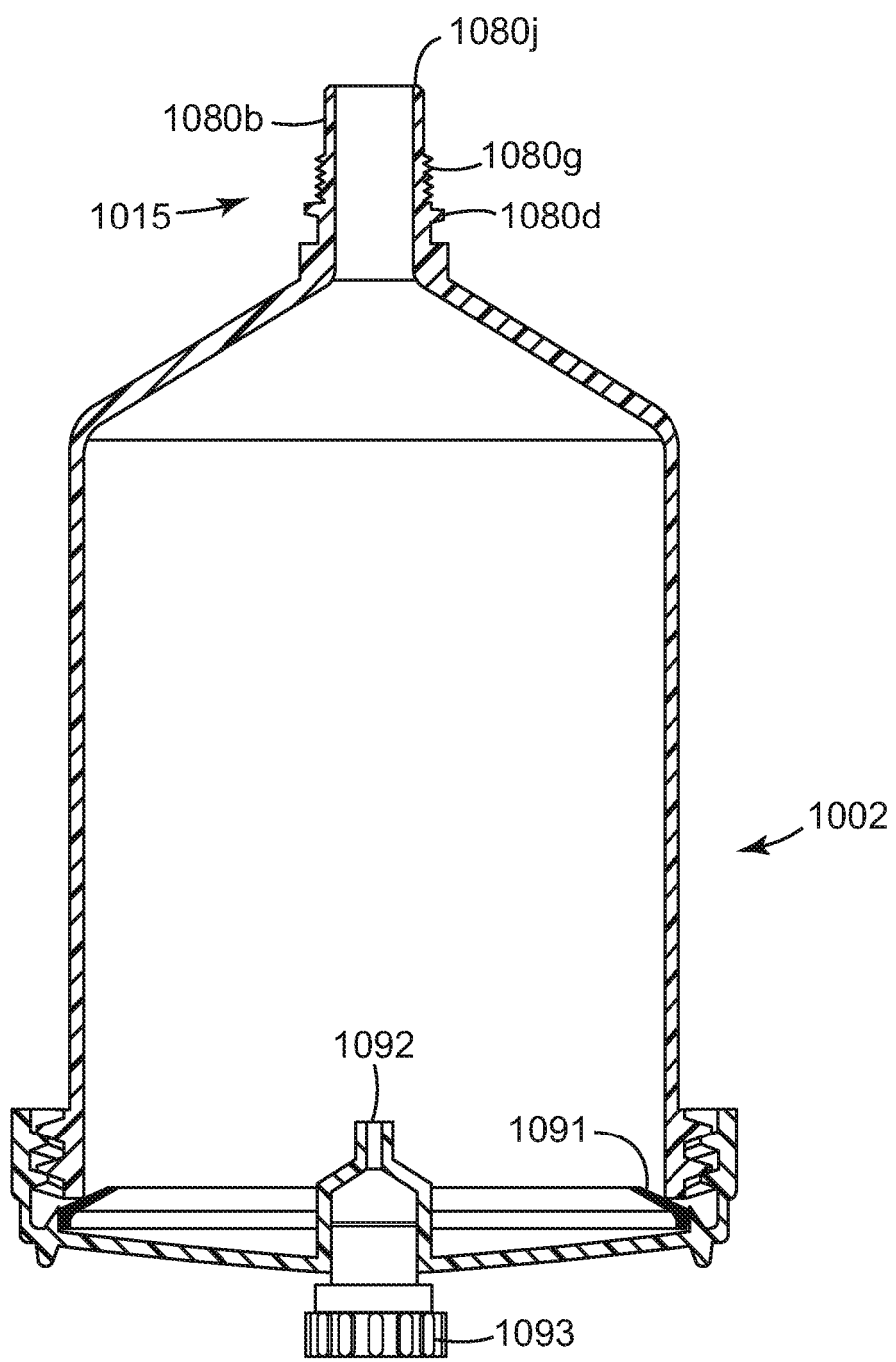
FIG. 47 is a longitudinal sectional view of the reservoir shown in FIG. 45.

The spout and reservoir could be formed separately and secured together, for example by welding, or they could be formed integrally, for example by moulding. FIGS. 45 to 47 shows a moulded plastics reservoir 1002 provided with an integral spout 1015 at one end for connection to the socket 621 and a removable lid 1090 at the opposite end for adding liquid to the reservoir 1002. The lid 1090 is provided with an annular seal 1091 and an air vent 1092 closed by a removable plug 1093.

As shown, the spout 1015 has a cylindrical portion 1080a provided with a helical projection 1080d for co-operating with the lug 686 on the gun body 603. The cylindrical portion 1080a leads to an externally threaded portion 1080g that is a clearance fit in the outer bore portion 621a of the socket 621 and in turn leads to a cylindrical portion 1080b that is received in the inner bore portion 621b of the socket 621.

The reservoir 1002 is secured to the gun body 603 in similar manner to the insert 780 above-described by inserting the spout 1015 into the socket 621 with the lug 686 aligned with a gap 1089 between the ends of the helical projection 1080*d*. The reservoir 1002 is then rotated to engage the helical projection 1080*d* with the underside of the lug 686 causing the spout 1015 to move into the socket 621 until a sealing face 1080*f* at the inner end contacts and forms a fluid tight seal with an opposed sealing face in the socket 621.

In a modification (not shown), the cylindrical portion 1080*b* is an interference fit within the inner bore portion 621*b* to provide a fluid tight seal in similar manner to the insert 680. Alternatively, the cylindrical portion 1080*b* may be provided with one or more sealing ribs to provide a fluid tight seal with the inner bore portion 621*b* similar to the insert 980.

The cylindrical portion 1080*a* may be provided with a second projection similar to the insert 680 that provides a stop to limit insertion of the spout 1015 into the socket 621. Alternatively or additionally, an axial abutment 1080*h* may be provided at the upper end of the helical projection 1080*d* to provide an end stop to limit rotation of the insert relative to the lug 686.

The screw threaded portion 1080*g* allows the reservoir 1002 to be connected to a spray gun provided with a threaded socket either in the gun body or in an adaptor mounted on the gun body. It will be understood that the screw threaded portion 1080*g* may be omitted.

Figure 48:
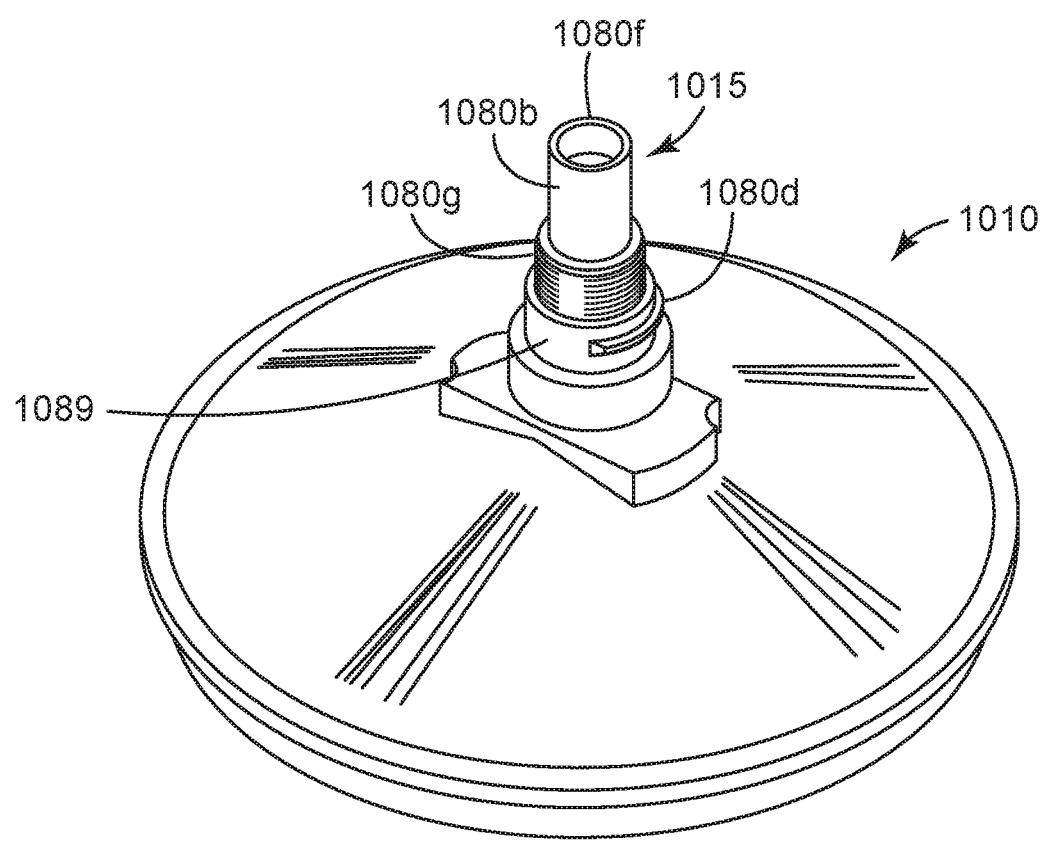
FIG. 48 is a perspective view of a reservoir lid with integral spout adapted for connection to the spray gun of FIG. 20.
Figure 49:
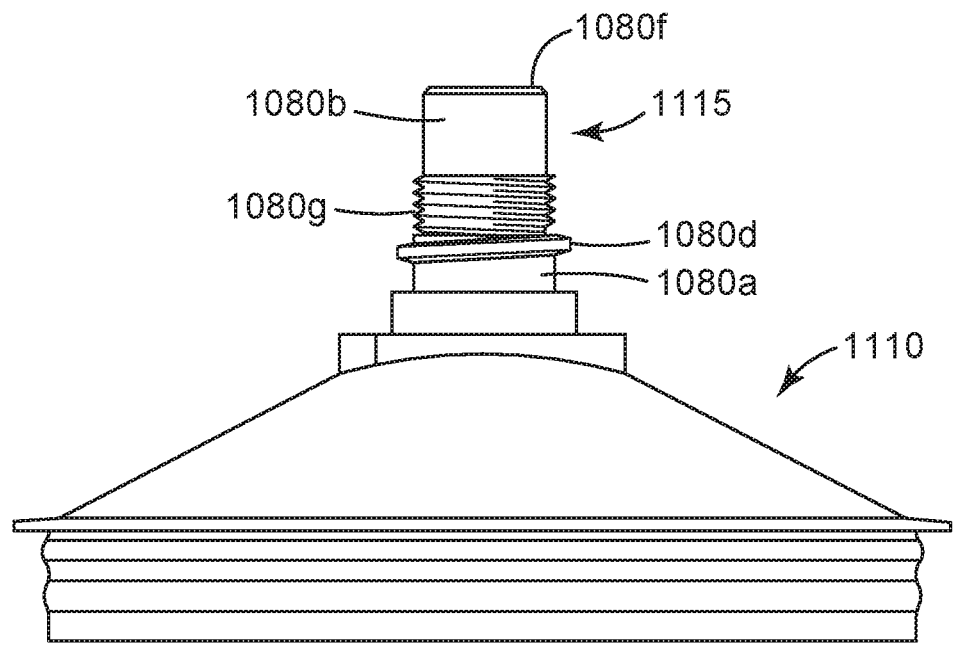
FIG. 49 is a side view of the reservoir lid shown in FIG. 48.
Figure 50:
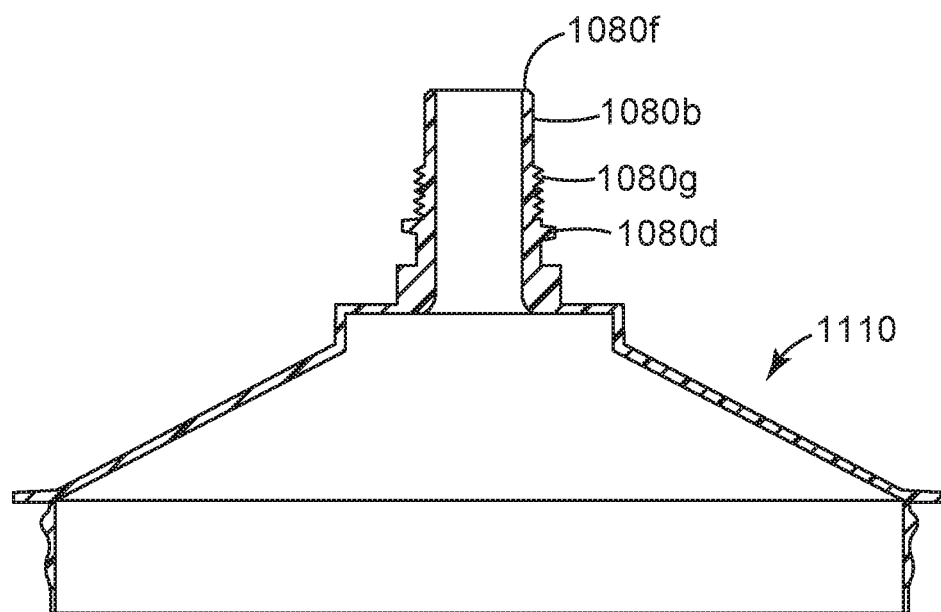
FIG. 50 is a longitudinal sectional view of the reservoir lid shown in FIG. 48.

In another arrangement, the reservoir could be provided with a separate detachable part such as a lid and the spout and lid could be formed separately and secured together or they could be formed integrally. FIGS. 48 to 50 show a moulded plastics lid 1110 for a reservoir (not shown) of the type described previously with reference to FIGS. 1 to 6.

As shown, the lid 1110 is provided with an integral spout 1115 for connection to the socket 621. The spout 1115 is similar to the integral spout 1015 of the reservoir 1002 described above and the construction and operation will be understood from the previous description of the spout 1015.

The above-described embodiments illustrate the manner in which the present invention provides a quick-fit connection to secure releasably the reservoir to the spray gun by connector means integral with the spray gun that avoids the use of screw threads.

The quick-fit connection also allows the reservoir to be releasably secured to the spray gun when containing paint by a simple push-twist action requiring less than one complete rotation of the reservoir that reduces the risk of spillage.

It will be appreciated that the exemplary embodiments described herein are intended to illustrate the diverse range and application of the invention and that features of the embodiments may be employed separately or in combination with any other features of the same or different embodiments.

Moreover, while the exemplary embodiments described and illustrated are believed to represent the best means currently known to the applicant, it will be understood that the invention is not limited thereto and that various modifications and improvements can be made within the spirit and scope of the invention as generally described herein.

For example, where the outlet spout is adapted for connection directly to the socket, a valve system may be incorporated into the connection such that, on connecting the spout, a shut-off device is opened to facilitate the flow of liquid from the reservoir to the spray gun. The shut-off device may be opened in response to insertion and/or rotation of the outlet in the socket and closed by a reverse operation when disconnecting the reservoir.

Other arrangements for releasably securing the reservoir to the spray gun will be apparent to those skilled in the art. For example, the socket may be recessed in the body of the gun and adapted to receive the connector tube of the reservoir. The reservoir and spray gun may be provided with any suitable interengageable formations for releasably securing the reservoir to the spray gun without employing multiple screw threads on the reservoir and spray gun.

It will also be understood, that each of the inserts could be adapted to convert the socket to mount the reservoir using any other connection system to secure the reservoir to the insert. For example, the insert and reservoir could be provided with interengageable bayonet formations as shown in FIG. 9. Alternatively, one of the insert and reservoir could be provided with a flange and the other with at least one hook member engageable with the flange as shown in FIGS. 5 and 6. Alternatively, one of the insert and reservoir could be provided with a flange and the other with at least one spring leg arranged to engage the flange and permit rotation of the reservoir relative to the socket in a fluid tight manner as described in our co-pending UK patent application No. 0307902.7 filed 5 Apr. 2003.

The reservoir may be of any construction for containing paint to be delivered to the spray gun. For example, the reservoir may contain the paint in a collapsible container that is thrown away on completion of spraying as described. Alternatively, the reservoir may contain the paint in a re-usable paint pot that is cleaned on completion of spraying.

The reservoir may be constructed to permit paint to be added to the reservoir while attached to the spray gun. In this way, the reservoir may be re-filled without detaching the reservoir from the spray gun to allow spraying of areas requiring a larger volume of paint than the reservoir can hold. As a result, the reservoir can be of a compact size and shape that facilitates handling the spray gun. In particular, the balance, stability and maneuverability of the spray gun may be enhanced by employing a re-fillable reservoir of low volume.

The reservoir may be pre-filled with the paint to be sprayed. Alternatively, the reservoir may be supplied empty and filled by the end user. Pre-filling may be advantageous for spraying paints of standard colours that do not require special matching of the colour, for example primers, base coats etc.

The invention provides spray guns and reservoirs with integral co-operating formations that are mateable without screw threads. However, we may provide an adaptor plug for converting an existing paint pot having a screw threaded connector boss for use with the spray gun. Such plug may be screwed onto the connector boss of the paint pot and provided with formations for engagement with the non-threaded formations on the body of the spray gun. In this way, existing paint pots with a threaded connector boss can be used with the spray gun of the present invention.

The spray gun may be of the gravity feed type described herein. Alternatively, the spray gun may be of the suction feed type or pressure feed type. The pressure feed type may employ a bleed line from the compressed air supply to the gun to assist delivery of the paint from the reservoir to the spray gun. The invention may also apply to other types and constructions of spray guns for spraying liquids as defined herein.

Other modifications and improvements will be apparent to those skilled in the art and are deemed within the scope of the invention.

What is claimed is:

1. A lid for a reservoir of a gravity feed spray gun, the lid comprising an integral spout for direct connection to a socket of the gravity feed spray gun, said spout having a first cylindrical portion, provided with a non-threaded connector formation comprising a releasable connection for the socket of the spray gun that can be engaged with/disengaged from the socket of the spray gun by relative axial movement and/or by relative angular movement involving less than one complete turn about a connection axis; the non-threaded connector formation comprising a helical projection for co-operating with a lug on a spray gun body to cause the integral spout to move into the socket of the spray gun, wherein an abutment is provided at an end of the helical projection to provide an end stop to limit rotation of the lid relative to the lug.

2. The lid of claim 1, wherein said spout comprises a free end provided with a sealing face.

3. The lid of claim 1, wherein the abutment comprises an axial abutment at an upper end of the helical projection.

4. The lid of claim 1, wherein the helical projection comprises two ends, and wherein a gap is provided between the ends of the helical projection.

5. The lid of claim 1, wherein, in use, the helical projection is co-operable with the lug on the spray gun body with a push-twist action requiring less than one complete rotation of the spout.

6. The lid of claim 5, wherein the helical projection provides a ramp face co-operable with the lug so that, in use, the spout is displaced axially into the socket by engagement of the helical projection with the lug.

7. The lid of claim 1, wherein the helical projection extends for approximately 180 degrees in a circumferential direction.

8. The lid of claim 1 wherein the spout further comprises an externally threaded portion.

9. The lid of claim 1 wherein the spout further comprises a second cylindrical portion.

10. A liquid spraying apparatus comprising a spray gun and a reservoir for a liquid to be sprayed, the reservoir being releasably connectable to the spray gun by means of a quick-fit connector system employing mateable connectors on the spray gun and reservoir, wherein the reservoir is provided with the lid according to any of claim 1 and the mateable connectors comprise the helical projection on the spout of the lid and the lug on the spray gun body, the lug being integral with the spray gun body.

11. The liquid spraying apparatus of claim 10, wherein the spout further comprises a second cylindrical portion that is an interference fit within an inner bore portion of the socket.

* * * * *

UNITED STATES PATENT AND TRADEMARK OFFICE
CERTIFICATE OF CORRECTION

| | | Page 1 of 1 |
|---|---|---|
| PATENT NO. | : 10,850,290 B2 | |
| APPLICATION NO. | : 13/863028 | |
| DATED | : December 1, 2020 | |
| INVENTOR(S) | : Steve Joseph | |

It is certified that error appears in the above-identified patent and that said Letters Patent is hereby corrected as shown below:

In the Specification

<u>Column 1</u>
Line 10, after "herein" insert -- . --.

<u>Column 5</u>
Line 49, after "use" insert -- . --.

<u>Column 18</u>
Lines 7-11, delete "This requires less than one complete turn of the insert 680. The underside of the lug 686 may be of helical form having a pitch similar to that of the projection 680d to assist axial displacement of the insert 680 by engagement of the projection 680d with the underside of the lug 686." and insert the same on Column 18, Line 6, as a continuation of the same paragraph.

In the Claims

<u>Column 24</u>
Line 18, "according to any of claim 1" should read -- according to claim 1 --.

Signed and Sealed this
Sixth Day of July, 2021

Drew Hirshfeld
*Performing the Functions and Duties of the
Under Secretary of Commerce for Intellectual Property and
Director of the United States Patent and Trademark Office*